(12) United States Patent
Harada et al.

(10) Patent No.: US 9,998,620 B2
(45) Date of Patent: Jun. 12, 2018

(54) IMAGE PROCESSING DEVICE, IMAGE PROCESSING SYSTEM AND NON-TRANSITORY RECORDING MEDIUM WITH ENHANCED POWER SAVING

(71) Applicant: Konica Minolta, Inc., Chiyoda-ku, Tokyo (JP)

(72) Inventors: Hironori Harada, Amagasaki (JP); Kazuya Anezaki, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/370,074

(22) Filed: Dec. 6, 2016

(65) Prior Publication Data
US 2017/0171410 A1 Jun. 15, 2017

(30) Foreign Application Priority Data
Dec. 10, 2015 (JP) .................................. 2015-240809

(51) Int. Cl.
*H04N 1/00* (2006.01)
*H04N 1/327* (2006.01)

(52) U.S. Cl.
CPC ..... *H04N 1/00891* (2013.01); *H04N 1/00344* (2013.01); *H04N 1/32795* (2013.01); *H04N 2201/0094* (2013.01)

(58) Field of Classification Search
CPC ........... H04N 1/00891; H04N 1/00344; H04N 1/32795; H04N 2201/0094
See application file for complete search history.

(56) References Cited

U.S. PATENT DOCUMENTS 9,250,691 B2 * 2/2016 Vandeputte ........... G06F 1/3209
2006/0238173 A1 * 10/2006 Taniguchi ................ G01R 1/36
323/211
(Continued)

FOREIGN PATENT DOCUMENTS

JP 2004-048532 A 2/2004
JP 2011-188124 A 9/2011
(Continued)

OTHER PUBLICATIONS

Office Action dated Jan. 23, 2018, by the Japanese Patent Office in corresponding Japanese Patent Application No. 2015-240809 and English translation of the Office Action (17 pages).

*Primary Examiner* — Ming Hon
(74) *Attorney, Agent, or Firm* — Buchanan Ingersoll & Rooney PC

(57) ABSTRACT

An image processing device that is capable of executing a job by working together with a server, having: an application that establishes a connection that enables a communication with the server, and establishes periodic communications with the server at predetermined time intervals to maintain the connection; a periodic communication managing part that manages the periodic communication with the server by the application; and a power controller that includes a timer that measures a time elapsed after the application establishes the periodic communication, the power controller starting again a power supply to the application when the timer measures the time interval after the power supply to the application is stopped if a predetermined condition is met. The periodic communication managing part enables the application to establish the periodic communication with the server and resets the measured time before the power supply to the application is stopped by the power controller.

32 Claims, 20 Drawing Sheets

(56) References Cited

U.S. PATENT DOCUMENTS

| | | | |
|---|---|---|---|
| 2008/0279131 A1 | 11/2008 | Malladi et al. | |
| 2013/0003106 A1* | 1/2013 | Nishida | G06F 3/1222 358/1.14 |
| 2014/0016389 A1* | 1/2014 | Liu | G11C 11/401 365/63 |
| 2014/0025832 A1* | 1/2014 | Ito | H04L 65/1069 709/228 |
| 2015/0172493 A1* | 6/2015 | Anezaki | H04N 1/00891 358/1.13 |
| 2015/0199000 A1* | 7/2015 | Kawaura | G06F 1/3284 358/1.13 |
| 2016/0203393 A1* | 7/2016 | Amano | H04W 36/0011 358/1.15 |

FOREIGN PATENT DOCUMENTS

| | | |
|---|---|---|
| JP | 2013-031188 A | 2/2013 |
| JP | 2015-115831 A | 6/2015 |

* cited by examiner

IMAGE PROCESSING SYSTEM 1

FIG. 3

PERIODIC COMMUNICATION INFORMATION 22

| PERIODIC COMMUNICATION INTERVAL (MINS) | TIMEOUT PERIOD (MINS) | CHANGEABLE RANGE (MINS) |
|---|---|---|
| 5 | 12 | 3~10 |

22a, 22b, 22c

IMAGE PROCESSING SYSTEM 1

IMAGE PROCESSING DEVICE, IMAGE PROCESSING SYSTEM AND NON-TRANSITORY RECORDING MEDIUM WITH ENHANCED POWER SAVING

The present U.S. patent application claims a priority under the Paris Convention of Japanese patent application No. 2015-240809 filed on Dec. 10, 2015, the entirety of which is incorporated herein by references.

BACKGROUND OF THE INVENTION

Field of the Invention

The present invention relates to an image processing device, an image processing system and a non-transitory recording medium. The present invention more specifically relates to a technique to enhance power-saving effect at the image processing device that maintains a connection with a server.

Description of the Background Art

Image processing devices such as MFPs (Multi-Function Peripherals) are capable of executing jobs by working together with a server installed on a cloud on Internet. The image processing device accesses the server on Internet from a local environment, for example, thereby storing image data generated by a scan job or executing a job such as a print job by obtaining the image data stored in the server.

In the local environment where the image processing device is installed, it is general to build a firewall in a view of security. In order to send the print job from the server to the image processing device as the image processing device is not accessing the server, it is required to develop an environment that enables the server on Internet to communicate with the image processing device over the firewall.

It is conventionally introduced to install a dedicated gateway for communication with the server on Internet in the local environment to develop the above-described environment. This known technique is introduced for example in Japanese Patent Application Laid-Open No. JP 2015-115831 A. According to the known gateway, it establishes a constant connection using XMPP (eXtensible Messaging and Presence Protocol) with the server on Internet when it is powered on, for example, thereby establishing a path that allows the server to communicate with the image processing device in the local environment over the firewall. Hence, even when the image processing device is not accessing the server, the server on Internet communicates by a tunnel by using the path established between the gateway and the server, thereby sending information such as the print job to the image processing device in the local environment.

The image processing device having a function of the above-described gateway function has been provided recently. The image processing device is configured to establish the connection with the server on Internet and communicate with the server on a periodical basis at predetermined time intervals.

On the other hand, the image processing device has a sleep function aimed at electric power-saving. Even when the connection with the server is established, the image processing device enters a deep sleep mode if a predetermined condition is met. Once entering deep sleep mode, the image processing device stops a function to communicate with the server on the periodical basis. The periodic communication with the server is not established, and the connection between the image processing device and the server may be terminated. In order to avoid this, even when the image processing device enters deep sleep mode, it is required to put the power state of the image processing device back to an original normal mode at the predetermined time intervals to establish the periodic communication with the server.

It is assumed it is the time to establish the periodic communication with the server soon after the image processing device enters the deep sleep mode. In this case, the image processing device immediately returns from deep sleep mode to the normal mode. The time in the deep sleep mode gets shortened and the full power saving effect cannot be obtained.

SUMMARY OF THE INVENTION

The present invention is intended to solve the above problems. Thus, the present invention is intended to provide an image processing device, an image processing system and a non-transitory recording medium capable of obtaining an additional power saving effect compared to that in the past.

First, the present invention is directed to an image processing device that is capable of executing a job by working together with a server.

To achieve at least one of the abovementioned objects, according to an aspect, the image processing device reflecting one aspect of the present invention comprises: an application that establishes a connection that enables a communication with the server, and establishes periodic communications with the server at predetermined time intervals to maintain the connection; a periodic communication managing part that manages the periodic communication with the server by the application; and a power controller that includes a timer that measures a time elapsed after the application establishes the periodic communication with the server, the power controller starting again a power supply to the application when the timer measures the time interval after the power supply to the application is stopped if a predetermined condition is met. The periodic communication managing part enables the application to establish the periodic communication with the server and resets the measured time of the timer before the power supply to the application is stopped by the power controller.

Second, the present invention is directed to an image processing system.

To achieve at least one of the abovementioned objects, according to an aspect, the image processing system reflecting one aspect of the present invention comprises: a server and an image processing device capable of executing a job by working together with the server. The server includes: a connection managing part that establishes a connection that enables a communication with the image processing device in response to a connection request from the image processing device and maintains the connection with the image processing device by receiving a periodic communication established at predetermined time intervals from the image processing device, and terminates the connection if a predetermined period of time has elapsed without receiving the periodic communication from the image processing device. The image processing device includes: an application that establishes the connection that enables the communication with the server by sending the connection request to the server, and establishes the periodic communications with the server at the predetermined time intervals to maintain the connection; a periodic communication managing part that manages the periodic communication with the server by the application; and a power controller that includes a timer that measures a time elapsed after the application establishes the periodic communication with the server, the power controller starting again a power supply to the application when the timer measures the time interval after the power supply to the application is stopped if a predetermined condition is met. The periodic communication managing part enables the application to establish the periodic communication with the server and resets the measured time of the timer before the power supply to the application is stopped by the power controller.

Third, the present invention is directed to a non-transitory recording medium storing a computer readable program to be executed by an image processing device that is capable of executing a job by working together with a server.

To achieve at least one of the abovementioned objects, according to an aspect, the non-transitory recording medium reflecting one aspect of the present invention stores the computer readable program executed on the image processing device to function as a system comprising: an application that establishes a connection that enables a communication with the server, and establishes periodic communications with the server at predetermined time intervals to maintain the connection; and a power controller that includes a timer that measures a time elapsed after the application establishes the periodic communication with the server, the power controller starting again a power supply to the application when the timer measures the time interval after the power supply to the application is stopped if a predetermined condition is met. Execution of the computer readable program by the image processing device causing the image processing device to execute the steps of: (1) enabling the application to establish the periodic communication with the server before the power supply to the application is stopped by the power controller; and (2) resetting the measured time of the timer.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 shows an example of periodic communication information;

DESCRIPTION OF THE PRESENT PREFERRED EMBODIMENTS

Hereinafter, embodiments of the present invention will be described with reference to the drawings. However, the scope of the invention is not limited to the illustrated examples.

First Preferred Embodiment

Figure 1:
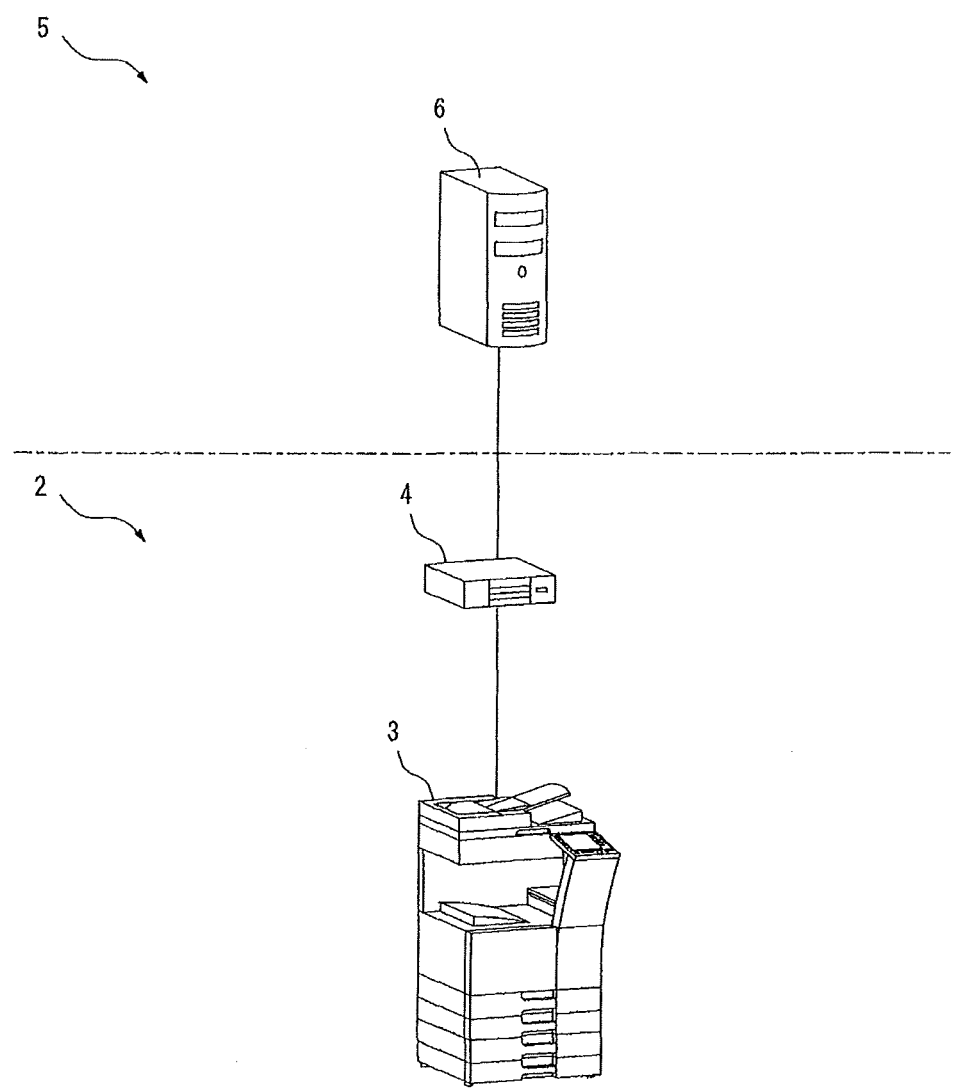
FIG. 1 shows an exemplary configuration of an image processing system of a first preferred embodiment.

FIG. 1 shows an exemplary configuration of an image processing system 1 of the first preferred embodiment of the present invention. The image processing system 1 comprises an image processing device 3 and a communication relay device 4 on a local network 2 such as a LAN (Local Area Network). A server 6 is installed on a cloud 5 on Internet.

The image processing device 3 constructed by a device such as one of MFPs, for instance, is capable of executing a variety of jobs including a scan job and a print job. The image processing device 3 is also capable of executing the job by working together with the server 6 on the cloud 5. The image processing device 3 has a sleep function aimed at a power-saving. When a certain condition such as maintaining a state that no user uses the image processing device 3 more than a predetermined period of time is met, for example, the sleep function is activated and the power supply to each processing part is stopped.

The communication relay device 4 is constructed by a device such as a network router, for instance. The communication relay device 4 connects the local network 2 to Internet. The communication relay device 4 has a firewall function. The communication relay device 4 blocks the access to the local network 2 from Internet besides the communication using a constant connection established between the image processing device 3 and the server.

The server 6 provides a cloud service over Internet. The services provided by the server 6 include a variety of services such as a storage service to store a various types of data including document data and/or image data, an edit service to edit data such as a document and/or an image and an update service to update a firmware of the image processing device 3.

An application to execute the job by working together with the server 6 is installed in advanced on the image processing device 3 on the above-described image processing system 1. After the application is run on the image processing device 3, the image processing device 3 establishes a connection using a XMPP with the server on the cloud 5. To be more specific, the image processing device 3 sends a connection request to an address of the server 6 on the cloud 5 via the communication relay device 4. The server 6 establishes a new path using the XMPP and establishes the connection with the image processing device 3 based on the connection request from the image processing device 3. The server 6 communicates with the image processing device 3 on the periodical basis through the path, thereby maintaining the connection with the image processing device 3. The constant connection between the image processing device 3 and the server 6 is maintained so that the server 6 is capable of sending the print job to the image processing device 3 installed in the local network 2 using the connection. It is assumed that a user operates an information processing terminal such as a smartphone or a tablet terminal to access the server 6, specifies data stored in the server 6 to print, and designates the image processing device 3 in the local network 2 as a destination of the print job. In this case, the print job is sent from the server 6 to the image processing device 3. After receiving the print job from the server 6, the image processing device 3 executes the print job, thereby producing a printed output based on the data specified by the user. The server 6 is capable of sending a job other than the print job to the image processing device 3 using the connection with the image processing device 3. Also, the server 6 sends the firmware to the image processing device 3, thereby enabling an update of the firmware of the image processing device 3.

If the periodic communication with the image processing device 3 is stopped for more than a predetermined period of time, the server 6 terminates the connection with the image processing device 3. Thus, the server 6 is not allowed to send data such as the job and/or the firmware to the image processing device 3 in the local network 2.

After the connection between the image processing device 3 and the server 6 is established, the communication relay device 4 generates connection information and manages the connection (path) between the image processing device 3 and the server 6. A local address of the image processing device 3 in the local network 2 and an Internet address of the server 6 on the cloud 5 are associated with each other and registered as the connection information. The communication relay device 4 refers to the connection information, thereby relaying the communication between the image processing device 3 and the server 6. The communication between the image processing device 3 and the server 6 is established on a periodical basis so that the communication relay device 4 keeps the connection information. If the periodic communication between the image processing device 3 and the server 6 stops for more than the predetermined period of time, the communication relay device 4 discards the connection information and deletes the connection between the image processing device 3 and the server 6 as a target to manage. In this case, the connection between the image processing device 3 and the server 6 is terminated by the communication relay device 4, and the server 6 is no longer capable of sending the data such as the job and/or the firmware to the image processing device 3 in the local network 2. The time the communication relay device 4 keeps the connection information, in other words a waiting time (timeout period) until it is determined that the periodic communication between the image processing device 3 and the server 6 is stopped, is set in advance to be longer than a waiting time that the server 6 determines the periodic communication with the image processing device 3 is stopped.

After establishing the connection with the server 6 by running the application, the image processing device 3 communicates with the server 6 on the periodical basis at certain time intervals to maintain the connection. Even when the connection with the server 6 is established, the predetermined condition may be met. In such a case, the image processing device 3 activates the sleep function to stop the power supply to each processing part. After the sleep function in the image processing device 3 activates, the function to establish the periodic communication with the server 6 stops. Even while the sleep function is activating, the image processing device 3 measures the time interval to establish the periodic communication with the server 6. When it is the time to establish the periodic communication with the server 6, the image processing device 3 deactivates the sleep function to start the power supply to each processing part and establishes the periodic communication with the server 6. The image processing device 3 of the first preferred embodiment forcibly establishes the periodic communication with the server 6 just before it enters a sleep mode so that it controls to have a longer time in the sleep mode. The detail of the above-described image processing system 1 is described next.

Figure 2:
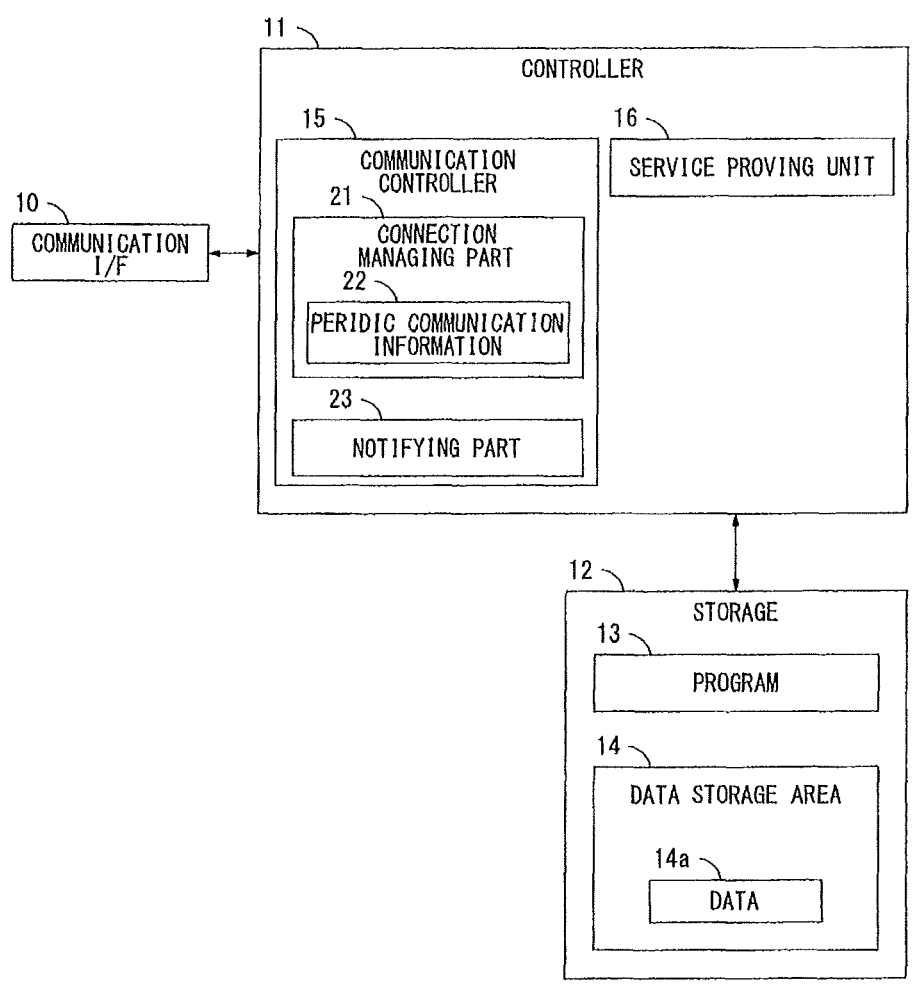
FIG. 2 is a block diagram showing an example of a hardware structure and that of a functional structure of a server.

FIG. 2 is a block diagram showing an example of a hardware structure and that of a functional structure of the server 6. As illustrated in FIG. 2, the server 6 includes a communication interface 10, a controller 11 and a storage 12 as its hardware structure. The communication interface 10 connects the server 6 to the network and enables the server 6 to communicate with the image processing device 3 over Internet. The controller 11 includes a CPU and a memory. The controller 11 manages the connection using the XMPP with the image processing device 3 and performs a process to provide the variety of cloud services. The storage 12 is formed from a nonvolatile storage device formed from a device such as a hard disk drive (HDD), for example. A program 13 executed by the CPU of the controller 11 is installed in advance in the storage 12, for instance. The storage 12 includes a data storage area 14 to provide the cloud service. A variety of data 14a including document data, image data and/or the firmware of the image processing device 3 is stored in the data storage area 14.

The CPU executes the program 13 so that the controller 11 serves as a communication controller 15 and a service providing unit 16. The communication controller 15 establishes the connection with the image processing device 3 using the XMPP and manages the connection. The communication controller 15 includes a connection managing part 21 and a notifying part 23. The service providing unit 16 provides the cloud service via the communication interface 10. The service providing unit 16, for example, reads the data 14a in the data storage area 14 and generates a print job. The service providing unit 16 then uses the connection established with the image processing device 3 by the communication controller 15 to send the print job to the image processing device 3, thereby enabling the image processing device 3 to execute the print job.

The connection managing part 21 establishes the connection with the image processing device 3 using the XMPP in response to the connection request from the image processing device 3. The connection managing part 21 then communicates with the image processing device 3 on the periodical basis, thereby maintaining the connection. To be more specific, after receiving the connection request from the image processing device 3, the connection managing part 21 establishes the new path using the XMPP to communicate with the image processing device 3 and assigns a unique session ID to the path. The connection managing part 21 notifies the image processing device 3 of the session ID. The connection managing part 21 then communicates with the image processing device 3 using the session ID, thereby effectively maintaining the path established with the image processing device 3. To be more specific, the connection managing part 21 uses the session ID for communication not only for sending and receiving the job to and from the image processing device 3 but also for the periodic communication with the image processing device 3. The connection managing part 21, therefore, maintains the path (connection) established with the image processing device 3.

The connection managing part 21 stores periodic communication infatuation 22 in the memory, for instance, and manages. The periodic communication information 22 is to manage the periodic communication with the image processing device 3. FIG. 3 shows an example of the periodic communication information 22. The periodic communication information 22 includes a periodic communication interval 22a, a timeout period 22b and a changeable range 22c. The time intervals between the periodic communications with the image processing device 3 to maintain the connection with the image processing device 3 is stated as the periodic communication interval 22a. A timing to terminate the connection with the image processing device 3 when the periodic communication from the image processing device 3 is not detected is stated as the timeout period 22b. A range (minimum value and maximum value) within which the time intervals between the periodic communications with the image processing device 3 can be changed is stated as the changeable range 22c. The connection managing part 21 manages the periodic communication with the image processing device 3 based on the periodic communication information 22. In the example of FIG. 3, the periodic communication information 22 includes the periodic communication interval 22a. The periodic communication interval 22a, however, is not always necessary. More specifically, even when the periodic communication interval 22a is stated, the connection managing part 21 effectively maintains the connection with the image processing device 3 until the elapse of the timeout period 22b. After the elapse of the timeout period 22b, the connection managing part 21 discards the session ID and terminates the connection with the image processing device 3. It is assumed that, for example, the server 6 is configured not to change the time intervals between the periodic communications. In such a case, the same values are set for the minimum value and the maximum value of the changeable range 22c, for example.

The notifying part 23 becomes operative when the periodic communication with the terminated session ID is received from the image processing device 3 after the connection with the image processing device 3 is terminated by the connection managing part 21. The notifying part 23 sends an error notice showing a timeout error to the image processing device 3.

Figure 4:
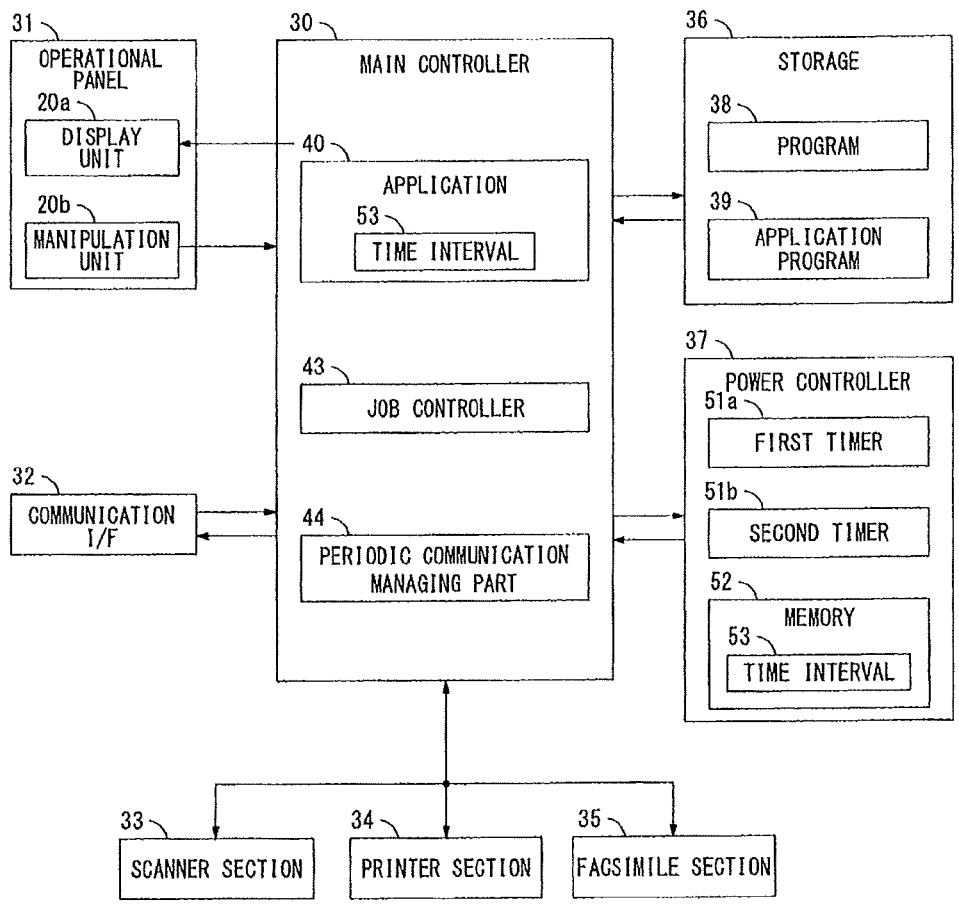
FIG. 4 is a block diagram showing an example of a hardware structure and that of a functional structure of an image processing device of the first preferred embodiment.

FIG. 4 is a block diagram showing an example of a hardware structure and that of a functional structure of the image processing device 3. The image processing device 3 includes a main controller 30, an operational panel 31, a communication interface 32, a scanner section 33, a printer section 34, a facsimile section 35, a storage 36 and a power controller 37 as its hardware structure. The main controller 30 controls operations of each processing part and includes a CPU and a memory which are not shown in FIG. 4. The operational panel 31 is a user interface for a user to operate the image processing device 3. The operational panel 31 includes a display unit 20a on which various types of information is displayed to the user and a manipulation unit 20b receives inputs by the user. The communication interface 32 is to connect the image processing device 3 to the local network 2 for communication.

The scanner section 33 optically reads a document placed by the user and generates image data. The printer section 34 forms a toner image based on the image data, transfers the toner image to a printing medium such as a printing sheet, and produces a printed output. The facsimile section 35 sends and receives facsimile data via a phone line which is not shown in FIG. 4.

The storage 36 is formed from a nonvolatile storage device formed from a device such as a hard disk drive (HDD), for example. A variety of programs executed by the CPU of the main controller 30 are stored in the storage 36. A program 38 to be an operating system of the image processing device 3 and an application program 39 to perform a process worked together with the server 6 on the cloud 5 are installed in advance in the storage 36 of the first preferred embodiment.

The power controller 37 controls the sleep function in the image processing device 3. The power controller 37 controls the three steps of power modes of the image processing device 3, for instance, including a normal mode, a sleep mode and a deep sleep mode. The normal mode is a normal power mode that supplies the power to the above-described each processing part. The normal mode enables an execution of the job at the image processing device 3. The sleep mode is the first step of the power-saving state. The image processing device 3 in the normal mode enters the sleep mode when it is not being used for a predetermined period of time. The sleep mode stops the power supply to the display unit 20a of the operational panel 31 and to a fixing heater which is not shown in FIG. 4 included in the printer section 34. The deep sleep mode is the second step of the power-saving state. The image processing device 3 in the sleep mode enters the deep sleep mode when it is not being used for another predetermined period of time. The deep sleep mode stops the power supply to the main controller 30, the display unit 20a of the operational panel 31, the scanner section 33, the printer section 34, the facsimile section 35 and the storage 36. Once the image processing device 3 is in deep sleep mode due to the control by the power controller 37, the main controller 30 stops its function. The image processing device 3 may enter deep sleep mode directly from normal mode without entering sleep mode.

The power controller 37 includes a first timer 51a and a second timer 51b. The first timer 51a measures a time to enable the image processing device 3 in normal mode to enter sleep mode or deep sleep mode. The first timer 51a becomes operative when the process relating to the job is not performed at the main controller 30, for example, and measures the time until enabling the image processing device 3 in normal mode to enter sleep mode or deep sleep mode. The second timer 51b measures a time interval between the periodic communications with the server 6 as the constant connection using XMPP is established between the image processing device 3 and the server 6. The second timer 51b especially measures a time until waking up the image processing device 3 in deep sleep mode to normal mode. The second timer 51b becomes operative when the image processing device 3 establishes the periodic communication with the server 6, for example, and measures the time interval for the image processing device 3 to establish the next periodic communication with the server 6.

After the predetermined period of time is measured by the first timer 51a, the power controller 37 enables the image processing device 3 in normal mode to enter sleep mode or that in sleep mode to enter deep sleep mode. It is assumed that the predetermined time interval is measured by the second timer 51b as the image processing device 3 is in deep sleep mode. In this case, the power controller 37 wakes up the image processing device 3 in deep sleep mode to normal mode. The power controller 37 then puts the image processing device 3 back to the state where the main controller 30 is allowed to establish the periodic communication with the server 6.

The power controller 37 includes a memory 52. A time interval 53 for the image processing device 3 to establish the periodic communication with the server 6 is stored in the memory 52. The power controller 37 refers to the time interval 53 in the memory 52, and wakes the image processing device 3 up from deep sleep mode to normal mode every time the second timer 51b measures the time interval 53 as the image processing device 3 is in deep sleep mode.

After the image processing device 3 is powered on, the CPU of the main controller 30 automatically reads and executes the program 38 in the storage 36. The main controller 30 then serves as a job controller 43 and a periodic communication managing part 44. The job controller 43 controls overall execution of the job at the image processing device 3. The job controller 43 receives an input of the job via the operational panel 31 or the communication interface 32 and puts the scanner section 33, the printer section 34 or the facsimile section 35 into operation, thereby controlling the execution of the received job. When the application 40 is run on the main controller 30, the periodic communication managing part 44 manages the periodic communication with the server 6 on the cloud 5 established by the application 40, and controls the periodic communication.

After the program 38 is run, the CPU of the main controller 30 automatically or in response to a user instruction reads and executes the application program 39 in the storage 36. The main controller 30 thus puts an application 40 into operation. The application 40 is run to perform the process worked together with the server 6 on the cloud 5. As being started to run, the application 40 sends a connection request to the server 6 and establishes the connection that enables the constant communication with the server 6. The application 40 obtains the session ID from the server 6 at this time. For communicating with the server 6 after establishing the connection with the server 6, the application 40 uses the session ID to communicate. In response to receiving the job from the server 6 using the connection, the application 40 outputs the received job to the job controller 43. As a result, the job received from the server 6 can be executed at the image processing device 3.

It is assumed that the job data is not sent or received to and from the server 6. In this case, the application 40 communicates with the server 6 on a periodical basis at the certain time intervals, thereby maintaining the connection with the server 6. The time interval 53 is set in advance with the application 40 as the time interval between the periodic communications. The time interval 53 is the same information as the time interval stated as the periodic communication interval 22a stored in the server 6. The application 40 includes an internal timer. The application 40 activates the internal timer when the job is not sent or received to and from the server 6. The application 40 automatically establishes the periodic communication with the server 6 every time the internal time measures the time stated as the time interval 53. The application 40, for example, sends an arrive signal with the session ID to the server 6, thereby establishing the periodic communication. It is assumed that the time interval 53 can be changed. In this case, the application 40 starts the periodic communication with the server 6 at the time specified by the periodic communication managing part 44 even when the internal timer has not measured the time stated as the time interval 53. Also, if the time interval 53 can be changed, the application 40 is allowed to change the time interval 53 based on the instruction from outside. If the time interval 53 cannot be changed, the application 40 does not receive the change in the setting of the time interval 53.

After being running on the main controller 40, the application 40 writes the time interval 53 to establish the periodic communication with the server 6 in the memory 52 of the power controller 37. As a result, the power controller 37 is capable of making the power mode of the image processing device 3 back to normal mode at the time the application 40 should establish the periodic communication even when the power mode of the image processing device 3 is entered deep sleep mode. The application 40 is allowed to establish the periodic communication with the server 6 at the time the power mode is back to normal mode. The power controller 37 makes the power mode back to normal mode for the periodic communication with the server 6. The power controller 37 may make the power mode back to sleep mode for the periodic communication with the server 6 instead of normal mode.

As the application 40 is running on the main controller 30, it manages the periodic communication with the server 6, and the periodic communication managing part 44 controls the periodic communication managed by the application 40. The periodic communication managing part 44 always monitors the timer 51a of the power controller 37 to see the time to enable the image processing device 3 to enter deep sleep mode. The periodic communication managing part 44 then controls the application 40 to forcibly establish the periodic communication with the server 6 by knowing the time at which the image processing device 3 enters deep sleep mode.

Figure 5:
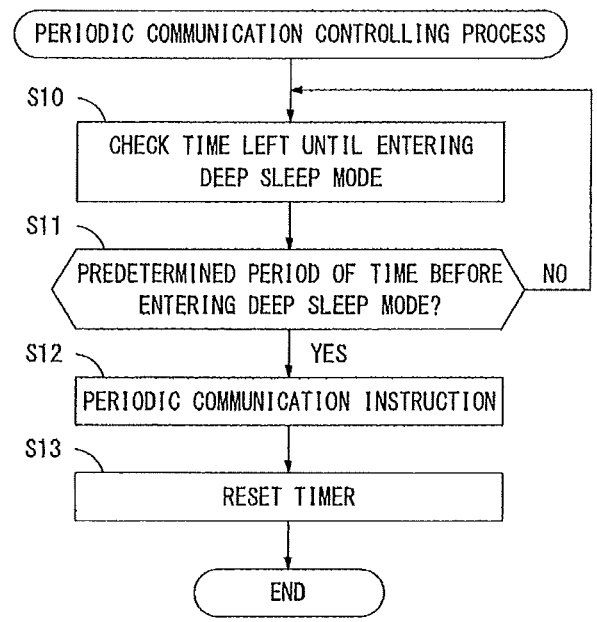
FIG. 5 is a flow diagram explaining an exemplary sequential procedure of a periodic communication controlling process performed by a periodic communication managing part.

FIG. 5 is a flow diagram explaining an exemplary sequential procedure of a periodic communication controlling process performed by the periodic communication managing part 44. The process starts as the application 40 is running. Upon start of the process, the periodic communication managing part 44 obtains a measured value of the first timer 51a of the power controller 37. The periodic communication managing part 44 checks the time left until entering deep sleep mode based on the measured value (step S10). The periodic communication managing part 44 then determines if it is a predetermined period of time before the time to enter deep sleep mode (step S11). It may not be the predetermined period of time before the time to enter deep sleep mode. In this case, the periodic communication managing part 44 returns to step S10 to wait until it becomes the predetermined period of time before the time to enter deep sleep mode. When it is the predetermined period of time before entering deep sleep mode (when a result of step S11 is YES), the periodic communication managing part 44 instructs the application 40 to establish the periodic communication with the server 6 (step S12). To be more specific, the periodic communication managing part 44 enables the application 40 to forcibly establish the periodic communication with the server 6 the predetermined period of time before entering deep sleep mode. As a result, even when the elapsed time from the previous periodic communication has not reached the certain time interval 53, the application 40 starts the periodic communication with the server 6. The periodic communication managing part 44 enables the application 40 to forcibly establish the periodic communication with the server 6, then resets the second timer 51b of the power controller 37 and the internal timer of the application 40 (step S13). The power controller 37 thus resets the measured value of the second timer 51b which is measuring to put the image processing device 3 in deep sleep mode back in normal mode to an initial value.

The periodic communication managing part 44 performs the above-described process while the power mode is normal mode. After the power mode enters deep sleep mode, the image processing device 3 is allowed to be kept in deep sleep mode until the time for the application 40 to establish the next periodic communication with the server 6. More specifically, the periodic communication managing part 44 enables the application 40 to forcibly establish the periodic communication with the server 6 just before entering deep sleep mode. This may prevent a situation that it becomes the time for the application 40 to establish the periodic communication with the server 6 soon after entering deep sleep mode, resulting in increase in duration of deep sleep mode.

Figure 6:
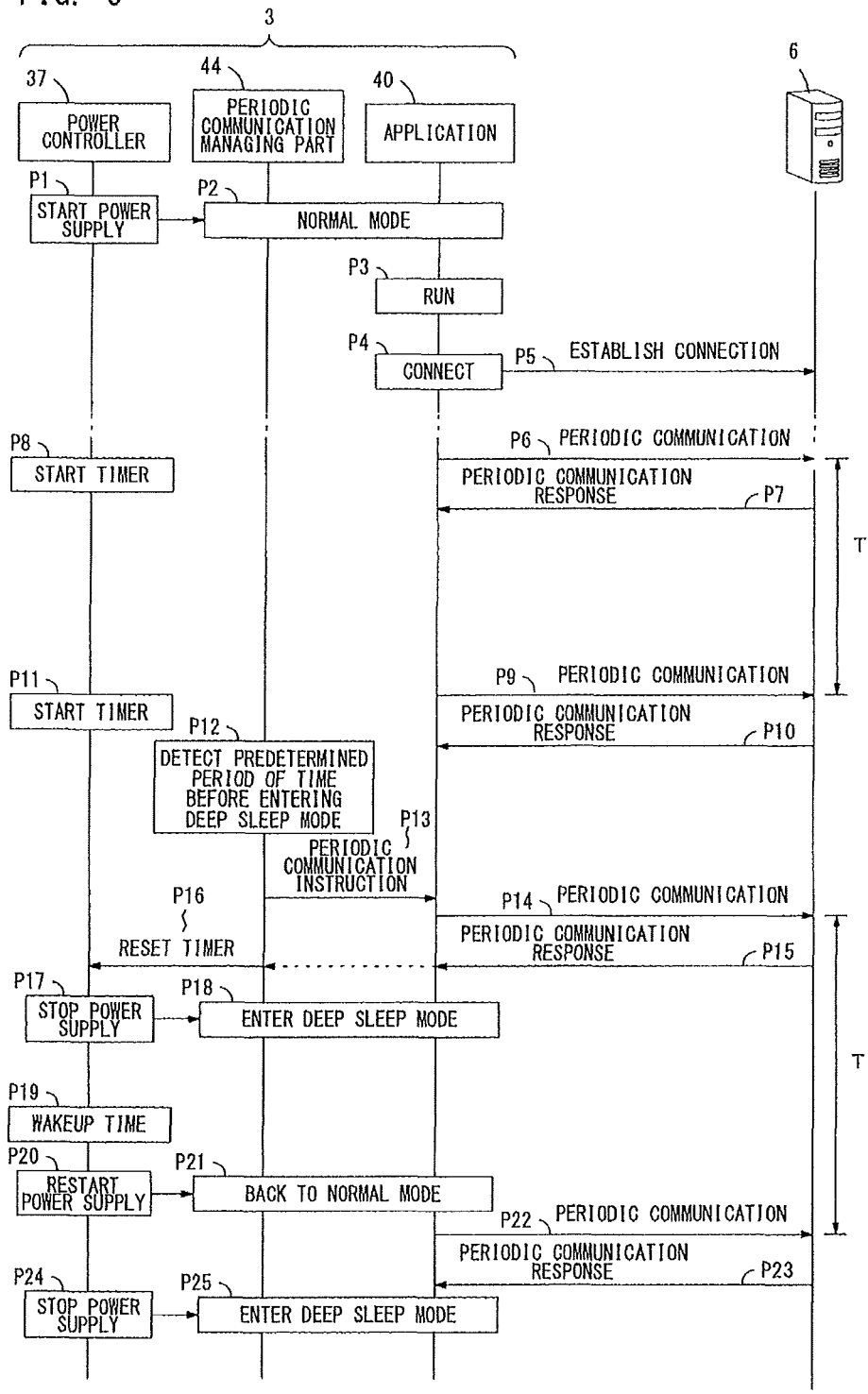
FIG. 6 is a flow diagram explaining an exemplary overall procedure of a process at the image processing system.

FIG. 6 is a flow diagram explaining an exemplary overall procedure of a process at the image processing system 1. Once the power supply to each processing part is started by the power controller 37 (process P1), the power mode of the image processing device 3 is in normal mode (process P2). When the application 40 runs as the image processing device 3 is in normal mode (process P3), the application 40 connects to the server 6 (process P4), and establishes the connection with the server 6 (process P5). It is assumed that the predetermined period of time elapses as the job is not sent or received to and from the server 6. In this case, the application 40 establishes the periodic communication using the connection with the server 6 (process P6). When receiving the normal periodic communication from the image processing device 3 as the connection with the image processing device 3 is maintained, the server 6 replies a periodic communication response to the periodic communication (process P7). In response to receiving the periodic communication response from the server 6, for example, the application 40 resets the internal timer and starts the operation to measure the time interval 53 until the next periodic communication. When the periodic communication is established between the application 40 and the server 6, the power controller 37 enables the second timer 51b to start measuring the time interval 53 (process P8). After the elapse of the time interval 53 as the image processing device 3 is in normal mode, the application 40 uses the connection with the server 6 to establish again the periodic communication (process P9). The server 6 then replies the periodic communication response to the image processing device 3 (process P10). The power controller 37 resets the second timer 51b and starts again the operation to measure the time interval 53 (process P11). An interval T from the previous periodic communication in process P6 to the next periodic communication in process P9 is almost equal to the time interval 53.

While the above-described process is performed, the periodic communication managing part 44 waits until it is the predetermined period of time before the time to enter deep sleep mode. After detecting it is the predetermined period of time before the time to enter deep sleep mode (process P12), the periodic communication managing part 44 outputs an instruction on the periodic communication to the application 40 (process P13). It is assumed that the time interval 53 stated in advance has not been elapsed yet from the previous periodic communication (process P9). Even in such a case, the application 40 starts the periodic communication with the server 6 (process P14). In response to receiving the periodic communication from the image processing device 3, the server 6 replies the periodic communication response to the periodic communication (process P15). The application 40 may establish the periodic communication in response to the periodic communication instruction from the periodic communication managing part 44. In this case, the application 40 notifies the periodic communication managing part 44 of receipt of the periodic communication response as receiving the periodic communication response from the server 6. After detecting that the application 40 receives the periodic communication response, the periodic communication managing part 44 instructs the power controller 37 to reset the timer in order to reset the second timer 51b which keeps measuring the time based on the instruction by the power controller 37 (process P16). As a result, the power controller 37 resets the measured value of the second timer 51b to the initial value, then starts the operation to measure from the initial value. This process is performed just before the image processing device 3 enters deep sleep mode.

If it is the time to enter deep sleep mode, the power controller 37 stops the power supply to the main controller 30 (process P17), and enables the power mode of the image processing device 3 to enter deep sleep mode (process P18). The periodic communication managing part 44 and the application 40 then stop their functions temporarily.

The power controller 37 keeps the second timer 51b to measure the time. Once detecting it is a wake up time when the measured value matches with the time interval 53 (process P19), the power controller 37 starts the power supply to the main controller 30 (process P20) and enables the power mode of the image processing device 3 to be back to normal mode (process P21). The application 40 then becomes operative again, and finds that it is the time for the next periodic communication. The application 40 starts the periodic communication with the server 6 after the image processing device 3 is powered back on and is back in normal mode (process P22), and receives the periodic communication response from the server 6 (process P23). By having such periodic communication, the connection between the image processing device 3 and the server 6 is maintained. After completion of the periodic communication with the server 6 by the application 40, the power controller 37 stops again the power supply to the main controller 30

(process P24). The power controller 37 enables the power mode of the image processing device 3 to enter deep sleep mode (process P25).

Figure 7:
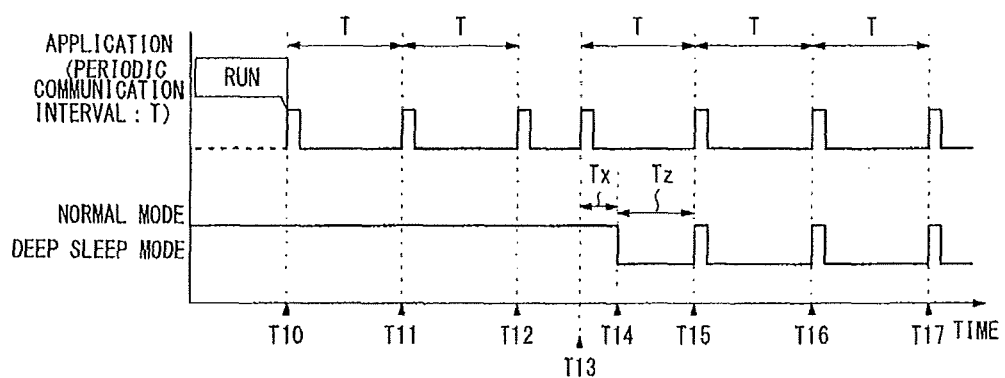
FIG. 7 shows a timing for an application to establish a periodic communication.

FIG. 7 shows a timing for the application 40 to establish the periodic communication. In the example of FIG. 7, T (minutes) is set as the time interval 53 which is the interval between the periodic communications by the application 40. As shown in FIG. 7, the application 40 is started to run at time T10. The application 40 then establishes the connection with the server 6, then establishes the periodic communication with the server 6 at time T11 that is the time interval T after T10. The application 40 establishes the periodic communication with the server 6 at time T12 that is the time interval T after T11. The image processing device 3 enters deep sleep mode from normal mode at time T14. The periodic communication managing part 44 outputs the periodic communication instruction to the application 40 at T13 which is a predetermined period of time Tx before time T14 at which the image processing device 3 enters deep sleep mode. The application 40, therefore, establishes the periodic communication with the server 6 at time T13. The second timer 51b of the power controller 37 is reset at this time, and it starts measuring the time interval T from the initial value. The image processing device 3 enters deep sleep mode from normal mode at time T14. The second timer 51b measures the time interval T at T15. The image processing device 3 is powered back on and back to normal mode at time T15. After having the periodic communication by the application 40, the image processing device 3 enters again deep sleep mode. The image processing device 3 is then powered back on and back to normal mode from deep sleep mode at the time intervals T on a periodical basis. The image processing device 3 keeps the process to enable the application 40 to establish the periodic communication at times T16 and T17 when it is powered back on and back to normal mode.

The image processing device 3 enables the application 40 to forcibly establish the periodic communication with the server 6 and resets the second timer 51b of the power controller 37 just before it enters deep sleep mode. As a result, time Tz until the image processing device 3 is back to normal mode to establish the next periodic communication after it enters deep sleep mode can be longer. This means that more than the certain period of time of the duration Tz in deep sleep mode can be obtained. The conventional image processing device 3 is sometimes back to normal mode soon after entering deep sleep mode. This can prevent that situation, resulting in better power-saving effect.

The server 6 can be accessed from the variety of local networks. The server 6 sometimes establishes the connections with more than one image processing device 3 at the same time. In such a case, the server 6 performs a response process one after another to the periodic communication received from each image processing device 3. The server 6 is sometimes not allowed to reply the periodic communication response soon after receiving the periodic communication from one of the image processing devices 3, and may take some time to reply the periodic communication response. Based on an assumption that the server 6 establishes the connections with more than one image processing device 3 at the same time, a few minutes may be set as the predetermined period of time Tx of FIG. 7 in order to have the image processing device 3 enter deep sleep mode after receiving the periodic communication response from the server 6.

If too long time is set as the predetermined period of time Tx, the time until the image processing device 3 enters deep sleep mode from the start of the periodic communication with the server 6 gets longer. Then, the duration Tz in deep sleep mode gets shorter. It is preferable for the application 40 to set the timeout period to time out the periodic communication response from the server 6 for establishing the periodic communication with the server 6 in response to the periodic communication instruction from the periodic communication managing part 44. The shorter time than the predetermined period of time Tx which is the time left until entering deep sleep mode is set as the timeout period. The power controller 37 enables the image processing device 3 in normal mode to enter deep sleep mode after the application 40 starts the periodic communication with the server 6. As a result, the image processing device 3 is allowed to enter deep sleep mode before the elapse of the predetermined period of time Tx, resulting in longer duration Tz in deep sleep mode.

Figure 8:
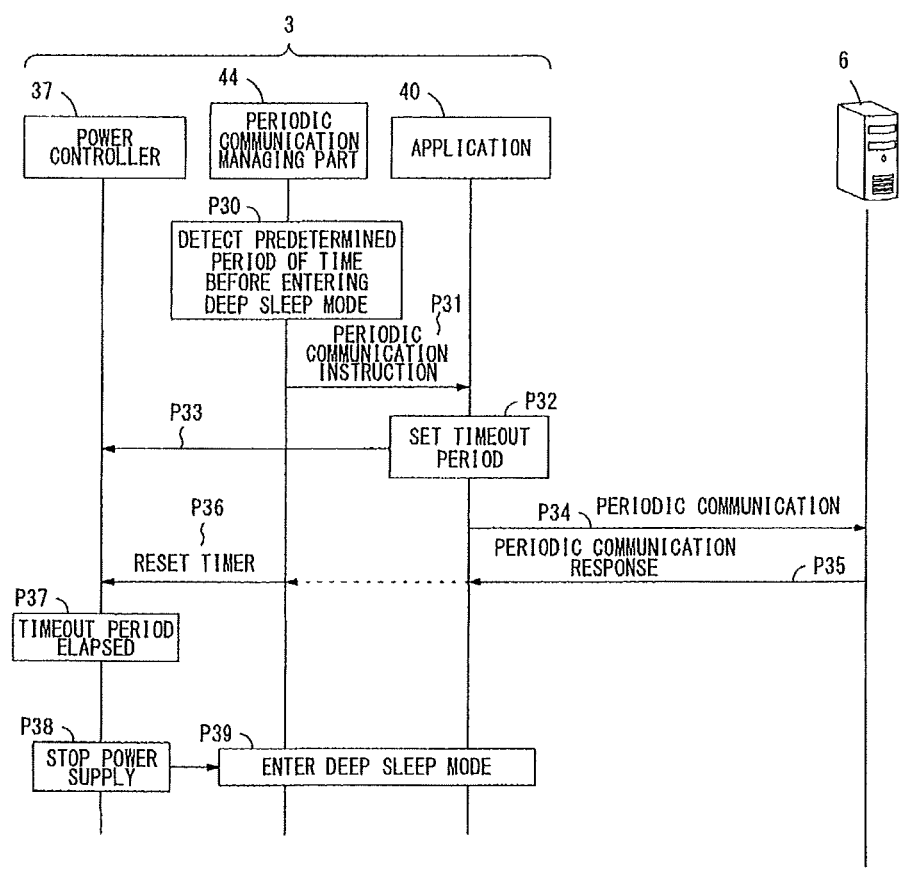
FIG. 8 is a flow diagram explaining an exemplary first operation to set a timeout period when the application establishes the periodic communication with the server in response to a periodic communication instruction.

FIG. 8 is a flow diagram explaining an exemplary first operation to set the timeout period when the application 40 establishes the periodic communication with the server 6 in response to the periodic communication instruction. In the exemplary first operation, the application 40 receives the periodic communication response from the server 6 before the elapse of the timeout period after starting the periodic communication with the server 6. As shown in FIG. 8, in response to detecting that it is the predetermined period of time before the time to enter deep sleep mode (process P30), the periodic communication managing part 44 outputs the periodic communication instruction to the application 40 (process P31). The application 40 then sets the timeout period (process P32), and notifies the power controller 37 of the set timeout period (process P33). The shorter time than the time left until entering deep sleep mode is set as the timeout period. As the timeout period is notified by the application 40, the power controller 37 changes the remaining time being measured by the first timer 51a to the timeout period. The time to enter deep sleep mode gets early.

The application 40 starts the periodic communication with the server 6 (process P34). After receiving the periodic communication from the image processing device 3, the server 6 replies the periodic communication response to the periodic communication (process P35). If a relatively light load is on the server 6, the periodic communication response from the server 6 is received by the application 40 before the elapse of the timeout period. The application 40 notifies the periodic communication managing part 44 of the receipt of the periodic communication response from the server 6. After detecting that the periodic communication response is received by the application 40, the periodic communication managing part 44 instructs the power controller 37 to reset the timer to reset the second timer 51b which is measuring the time in response to instruction by the power controller 37 (process P36).

After detecting that the timeout period measured by the first timer 51a has elapsed (process P37), the power controller 37 stops the power supply to the main controller 30 (process P38), and enables the power mode of the image processing device 3 to enter deep sleep mode (process P39). The periodic communication managing part 44 and the application 40 then stop their functions temporarily.

Figure 9:
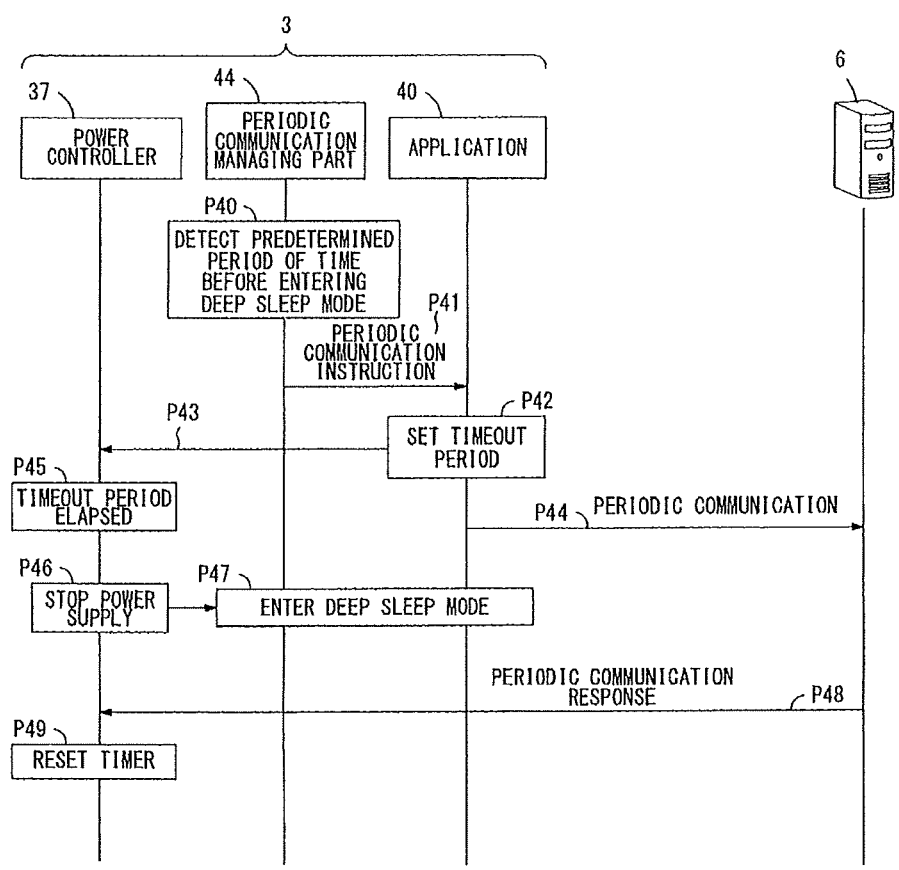
FIG. 9 is a flow diagram explaining an exemplary second operation to set the timeout period when the application establishes the periodic communication with the server in response to the periodic communication instruction.

FIG. 9 is a flow diagram explaining an exemplary second operation to set the timeout period when the application 40 establishes the periodic communication with the server 6 in response to the periodic communication instruction. In the exemplary second operation, the application 40 receives the periodic communication response from the server 6 after the elapse of the timeout period after starting the periodic communication with the server 6. As shown in FIG. 9, in response to detecting that it is the predetermined period of time before the time to enter deep sleep mode (process P40), the periodic communication managing part 44 outputs the periodic communication instruction to the application 40 (process P41). The application 40 then sets the timeout period (process P42), and notifies the power controller 37 of the set timeout period (process P43). The shorter time than the time left until entering deep sleep mode is set as the timeout period as the same as described above. As the timeout period is notified by the application 40, the power controller 37 changes the remaining time being measured by the first timer 51a to the timeout period. The time to enter deep sleep mode gets early.

The application 40 starts the periodic communication with the server 6 (process P44). If a relatively heavy load is on the server 6, the periodic communication response is not sent from the server 6 immediately and this causes the delay. The power controller 37 may detect the elapse of the timeout period before the application 40 receives the periodic communication response from the server 6 (process P45). In this case, the power controller 37 stops the power supply to the main controller 30 (process P46), and enables the power mode of the image processing device 3 to enter deep sleep mode (process P47) in response to detecting the elapse of the timeout period. The periodic communication managing part 44 and the application 40 then stop their functions temporarily.

After the periodic communication response is sent from the server 6 (process P48), the periodic communication response is received by the communication interface 32 and stored temporarily in a receive buffer. The power controller 37 monitors the data received by the communication interface 32 in deep sleep mode. When the data other than the periodic communication response is received from the server 6, the power controller 37 powers the image processing device 3 back on and puts the power state back to normal mode so that the main controller 30 is allowed to process the received data. The periodic communication response may be received from the server 6 in deep sleep mode. The power controller 37 then resets the timer to reset the second timer 51b without putting the power state back to normal mode from deep sleep mode (process P49).

Figure 10:
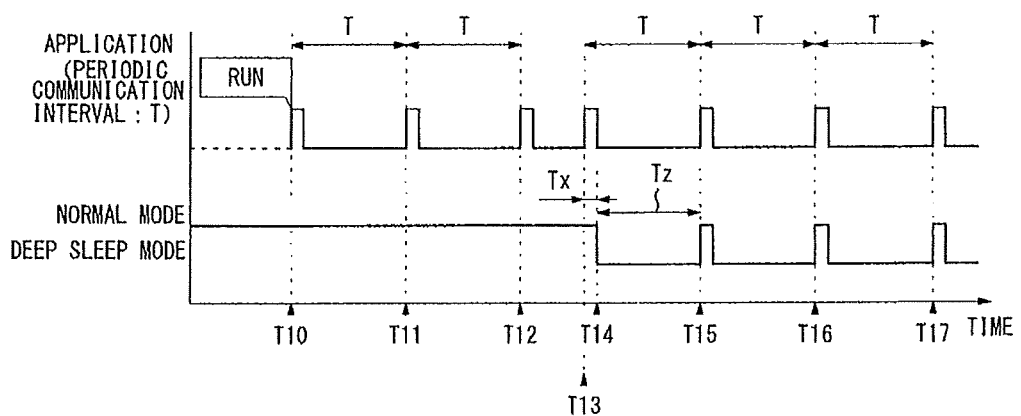
FIG. 10 shows a timing for the application to establish the periodic communication by setting the timeout period.

FIG. 10 shows a timing for the application 40 to establish the periodic communication by setting the timeout period. As shown in FIG. 10, the application 40 is started to run at time T10. The application 40 then establishes the connection with the server 6, then establishes the periodic communication with the server 6 at time T11 that is the time interval T after T10. The application 40 establishes the periodic communication with the server 6 at time T12 that is the time interval T after T11. The periodic communication managing part 44 outputs the periodic communication instruction to the application 40 at T13 which is the predetermined period of time before the time at which the image processing device 3 enters deep sleep mode. The application 40, therefore, establishes the periodic communication with the server 6 at time T13. The application 40 sets the timeout period Tx which is shorter than the time left until entering deep sleep mode. The image processing device 3 enters deep sleep mode from normal mode at time T14 which is after the elapse of the timeout period Tx. The image processing device 3 is powered back on and back to normal mode at time T15 when the second timer 51b measures the time interval T. After having the periodic communication by the application 40, the image processing device 3 enters again deep sleep mode. The image processing device 3 is then powered back on and back to normal mode from deep sleep mode at the time intervals T on the periodical basis. The image processing device 3 keeps the process to enable the application 40 to establish the periodic communication at times T16 and T17 when it is powered back on and back to normal mode.

As described above, the application 40 is forced to establish the periodic communication with the server 6 just before entering deep sleep mode. The image processing device 3 enters deep sleep mode when the predetermined timeout period has elapsed after the application 40 starts the periodic communication regardless of the receipt of the periodic communication response from the server 6. The time T14 for the image processing device 3 to enter deep sleep mode, therefore, can be earlier than the time T14 shown in FIG. 17. The longer duration Tz in deep sleep mode than the duration Tz of FIG. 7 can be obtained, resulting in much better power-saving effect.

As described above, the periodic communication managing part 44 of the first preferred embodiment is configured to enable the application 40 to establish the periodic communication and reset the measured time of the second timer 51b before the power supply to the application 40 is stopped by the power controller 37. The power supply to the application 40 may be stopped for a long time, resulting in better power-saving effect than in the past.

As described above, the periodic communication managing part 44 resets the measured time of the second timer 51b in response to receiving the periodic communication response from the server 6 after enabling the application 40 to establish the periodic communication with the server 6. However, this is given not for limitation. The measured time of the second timer 51b may be reset at the time when the application 40 is enabled to establish the periodic communication with the server 6.

As described above, the connection with the server is effectively maintained at the image processing device, and a higher power-saving effect than before can be obtained at the same time.

Second Preferred Embodiment

Figure 11:
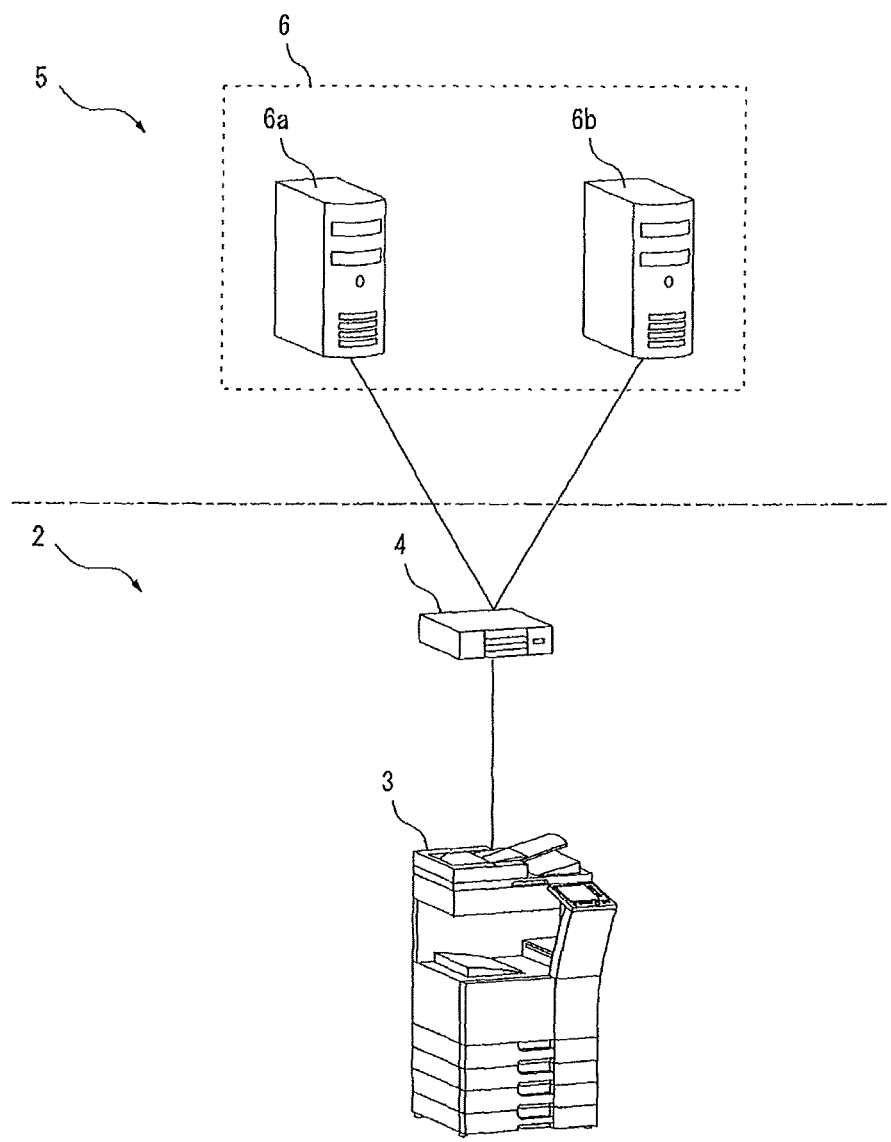
FIG. 11 shows an exemplary configuration of the image processing system of a second preferred embodiment.

The second preferred embodiment of the present invention is explained next. FIG. 11 shows an exemplary configuration of the image processing system 1 of the second preferred embodiment. The difference between the image processing system 1 of the first preferred embodiment and the second preferred embodiment is that the image processing device 3 communicates with a first server 6a and a second server 6b installed on the cloud 5 on Internet. More specifically, the server 6 of the second preferred embodiment on the cloud 5 includes the multiple servers 6a and 6b, and each of the multiple servers 6a and 6b provides own services. The image processing device 3 uses the multiple cloud services. The image processing device 3 then separately establishes the connection with each of the first server 6a and the second server 6b on the cloud 5 via the communication relay device 4. The hardware structure and that of the functional structure of each of the first server 6a and the second server 6b are the same as those shown in FIG. 2.

Figure 12:
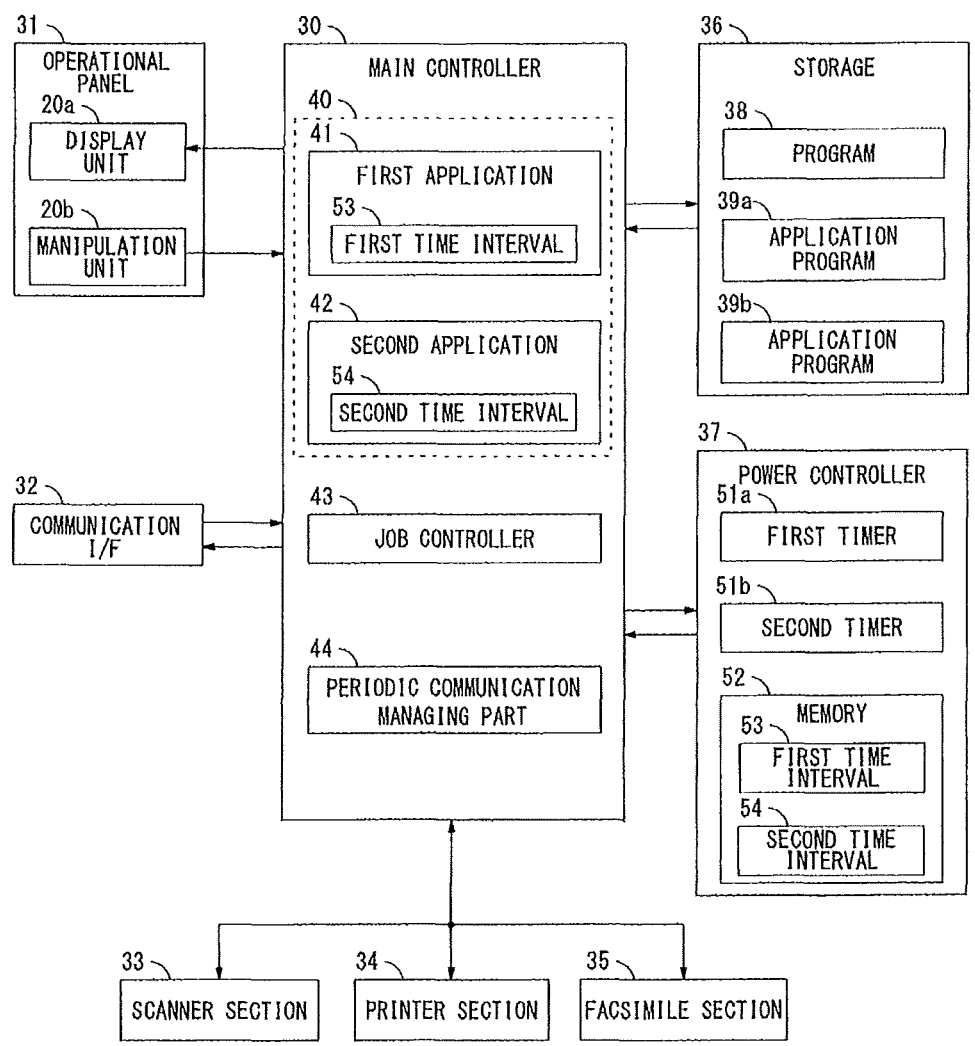
FIG. 12 is a block diagram showing an example of a hardware structure and that of a functional structure of an image processing device of the second preferred embodiment.

FIG. 12 is a block diagram showing an example of a hardware structure and that of a functional structure of the image processing device 3. Multiple application programs 39a and 39b are installed in advance in the storage 36 of the image processing device 3 of the second preferred embodiment. The CPU of the main controller 30 executes the application programs 39a and 39b so that a first application 41 and a second application 42 become operative in the main controller 30.

The first application 41 enables the image processing device 3 to execute the job by working together with the first server 6a. The first application 41 sends the connection request to the first server 6a when it starts to run, and establishes the connection that enables the constant communication with the first server 6a. When the job is not sent and received to and from the first server 6a, the first application 41 establishes the periodic communications with the first server 6a at the certain time intervals, thereby maintaining the connection with the first server 6a. The first time interval 53 is set in advance with the first application 41 as the time interval for the periodic communication. Once the first application 41 is started to run in the main controller 30, it writes the first time interval 53 for the periodic communication with the first server 6a in the memory 52 of the power controller 37. As a result, even when enabling the power mode of the image processing device 3 to enter deep sleep mode, the power controller 37 is allowed to power the image processing device 3 back on and put the power mode of the image processing device 3 back to normal mode at the timing the first application 41 should establish the periodic communication with the first server 6a.

The second application 42 enables the image processing device 3 to execute the job by working together with the second server 6b. The second application 42 sends the connection request to the second server 6b when it starts to run, and establishes the connection that enables the constant communication with the second server 6b. When the job is not sent and received to and from the second server 6b, the second application 42 establishes the periodic communications with the second server 6b at the certain time intervals, thereby maintaining the connection with the second server 6b. A second time interval 54 is set in advance with the second application 42 as the time interval for the periodic communication. Once the second application 42 is started to run in the main controller 30, it writes the second time interval 54 for the periodic communication with the second server 6b in the memory 52 of the power controller 37. As a result, even when enabling the power mode of the image processing device 3 to enter deep sleep mode, the power controller 37 is allowed to power the image processing device 3 back on and put the power mode of the image processing device 3 back to normal mode at the timing the second application 42 should establish the periodic communication with the second server 6b.

The other structures in FIG. 12 are the same as those explained in the first preferred embodiment.

According to the second preferred embodiment, each of the first application 41 and the second application 42 is forced to establish the periodic communication with the respective servers 6a and 6b just before the image processing device 3 enters deep sleep mode. Also, the values measured as the first time interval 53 and the second time interval 54 by the second timer 51b of the power controller 37 are reset.

Figure 13:
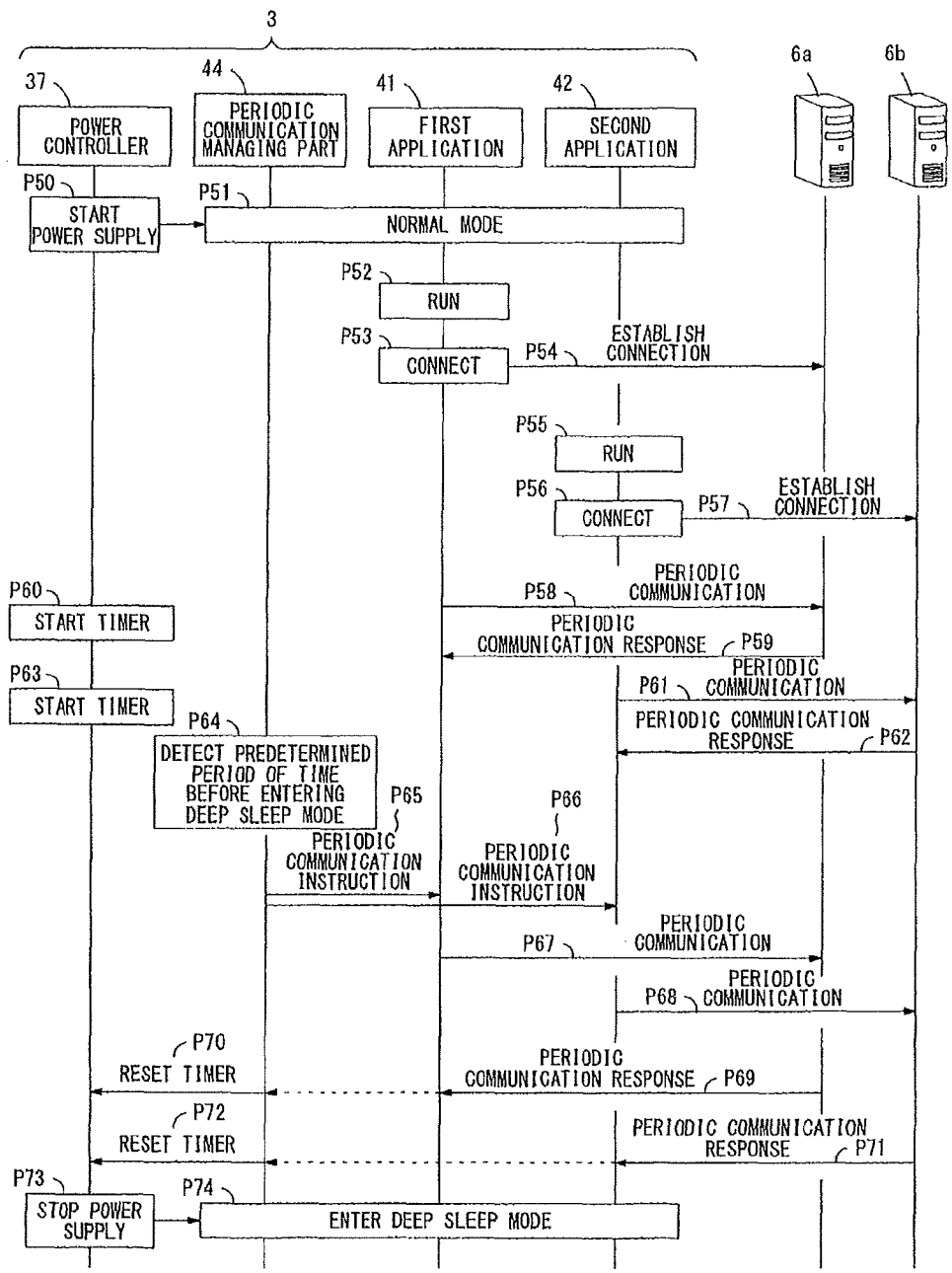
FIG. 13 is a flow diagram explaining an exemplary overall procedure of a process at the image processing system of the second preferred embodiment.

FIG. 13 is a flow diagram explaining an exemplary overall procedure of a process at the image processing system 1 of the second preferred embodiment. Once the power supply to each processing part is started by the power controller 37 (process P50), the power mode of the image processing device 3 is in normal mode (process P51). When the first application 41 runs as the image processing device 3 is in normal mode (process P52), the first application 41 connects to the first server 6a (process P53), and establishes the connection with the first server 6a (process P54). When the second application 42 runs next (process P55), the second application 42 connects to the second server 6b (process P56), and establishes the connection with the second server 6b (process P57).

It is assumed that the predetermined period of time elapses as the job is not sent and received to and from the first server 6a. In this case, the first application 41 establishes the periodic communication using the connection with the first server 6a (process P58). When receiving the periodic communication from the first application 41 as the connection with the image processing device 3 is maintained, the first server 6a replies the periodic communication response to the periodic communication (process P59). In response to receiving the periodic communication response from the first server 6a, the first application 41 resets the internal timer and starts the operation to measure the first time interval 53 until establishing the next periodic communication. When the periodic communication is established between the first application 41 and the first server 6a, the power controller 37 enables the second timer 51b to start the operation to measure the first time interval 53 (process P60).

After the elapse of the predetermined period of time as the job is not sent and received to and from the second server 6b, the second application 42 establishes the periodic communication using the connection with the second server 6b (process P61). When receiving the periodic communication from the second application 42 as the connection with the image processing device 3 is maintained, the second server 6b replies the periodic communication response to the periodic communication (process P62). In response to receiving the periodic communication response from the second server 6b, the second application 42 resets the internal timer and starts the operation to measure the second time interval 54 until establishing the next periodic communication. When the periodic communication is established between the second application 42 and the second server 6b, the power controller 37 enables the second timer 51b to start the operation to measure the second time interval 54 (process P63).

While the above-described process is performed, the periodic communication managing part 44 waits until it is the predetermined period of time before the time to enter deep sleep mode. After detecting it is the predetermined period of time before the time to enter deep sleep mode (process P64), the periodic communication managing part 44 outputs the periodic communication instruction to the first application 41 (process P65) and do the same to the second application 42 (process P66). It is assumed that the first time interval 53 or the second time interval 54 stated in advance has not elapsed yet from the previous periodic communications (processes P58 and P61). Even in such a case, the first application 41 and the second application 42 start the periodic communications with the respective first server 6a and second server 6b almost at the same time (processes P67 and P68).

In response to receiving the periodic communication from the first application 41, the first server 6a replies the periodic communication response to the periodic communication (process P69). The first application 41 may establish the periodic communication in response to the periodic communication instruction from the periodic communication managing part 44. In this case, the first application 41 notifies the periodic communication managing part 44 of the receipt of the periodic communication response as receiving the periodic communication response from the first server 6a. After detecting that the first application 41 receives the periodic communication response, the periodic communication managing part 44 instructs the power controller 37 to reset the timer in order to reset the second timer 51b which keeps measuring the first time interval 53 based on the instruction by the power controller 37 (process P70). As a result, the power controller 37 resets the measured value of the first time interval 53 of the second timer 51b to the initial value, then starts the operation to measure the time from the initial value.

In response to receiving the periodic communication from the second application 42, the second server 6b replies the periodic communication response to the periodic communication (process P71). The second application 42 may establish the periodic communication in response to the periodic communication instruction from the periodic communication managing part 44. In this case, the second application 42 notifies the periodic communication managing part 44 of the receipt of the periodic communication response as receiving the periodic communication response from the second server 6b. After detecting that the second application 42 receives the periodic communication response, the periodic communication managing part 44 instructs the power controller 37 to reset the timer in order to reset the second timer 51b which keeps measuring the second time interval 54 based on the instruction by the power controller 37 (process P72). As a result, the power controller 37 resets the measured value of the second time interval 54 of the second timer 51b to the initial value, then starts the operation to measure the time from the initial value. This process is performed just before the image processing device 3 enters deep sleep mode.

If it is the time to enter deep sleep mode, the power controller 37 stops the power supply to the main controller 30 (process P73), and enables the power mode of the image processing device 3 to enter deep sleep mode (process P74). The periodic communication managing part 44, the first application 41 and the second application 42 then stop their functions temporarily.

The power controller 37 then keeps the operation of the second timer 51b to measure the time. Once detecting the wake-up time when the measured value matches with either the first time interval 53 or the second time interval 54, the power controller 37 powers the image processing device 3 back on and put the power mode of the image processing device 3 back to normal mode.

Figure 14:
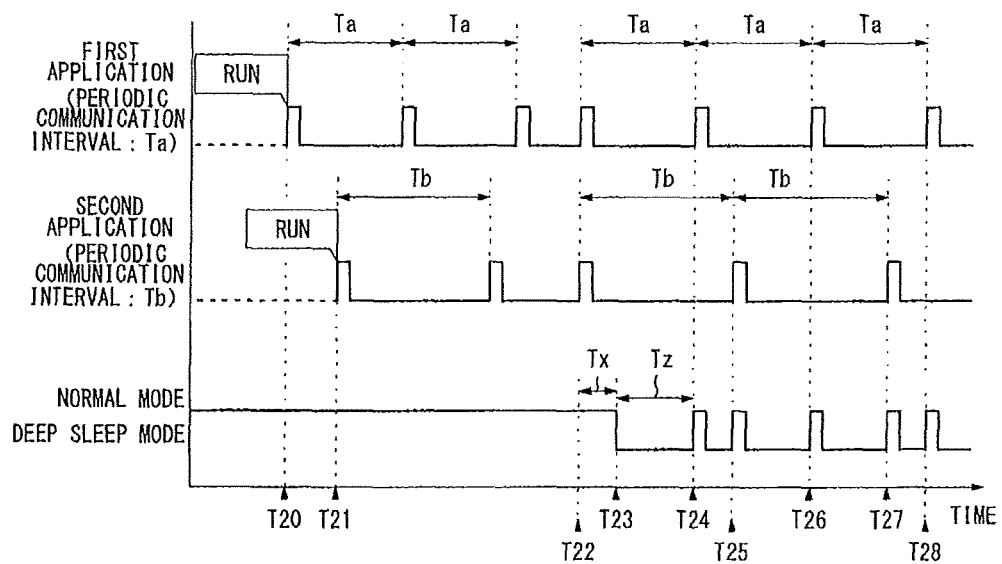
FIG. 14 shows a timing for a first application and a second application to establish the periodic communications.

FIG. 14 shows a timing for the first application 41 and the second application 42 to establish the periodic communications. In the example of FIG. 14, Ta (minutes) is set as the first time interval 53 which is the interval between the periodic communications by the first application 41, and Tb (minutes) is set as the second time interval 54 which is the interval between the periodic communications by the second application 42. As shown in FIG. 14, the first application 41 is started to run at time T20. The first application 41 establishes the connection with the first server 6a, then establishes the periodic communication with the first server 6a after the elapse of the first time interval Ta. The second application 42 is started to run at time T21. The second application 42 establishes the connection with the second server 6b, then establishes the periodic communication with the second server 6b after the elapse of the second time interval Tb.

The image processing device 3 enters deep sleep mode from normal mode at time T23. The periodic communication managing part 44 outputs the periodic communication instructions to the first application 41 and the second application 42 at T22 which is the predetermined period of time Tx before time T23 at which the image processing device 3 enters deep sleep mode. The first application 41 and the second application 42, therefore, establish the periodic communications with the respective first server 6a and second server 6b at time T22. The second timer 51b of the power controller 37 is reset at this time, and it starts measuring each of the first time interval Ta and the second time interval Tb from the initial value. The image processing device 3 enters deep sleep mode from normal mode at time T23.

It is assumed that the first time interval Ta is shorter than the second time interval Tb. In this case, the power controller 37 powers the image processing device 3 back on and put the power mode of the image processing device 3 back to normal mode at T24 at which the second timer 51b measures the first time interval Ta after enabling the image processing device 3 to enter deep sleep mode. After enabling the first application 41 to establish the periodic communication, the power controller 37 enables the image processing device 3 to enter deep sleep mode again. The power controller 37 then powers the image processing device 3 back on and put the power mode of the image processing device 3 back to normal mode at T25 at which the second timer 51b measures the second time interval Tb. After enabling the second application 42 to establish the periodic communication, the power controller 37 enables the image processing device 3 to enter to deep sleep mode again. The above-described process is repeatedly performed after this.

The image processing device 3 of the second preferred embodiment enables all the applications 41 and 42 those establishing connections with the respective servers 6a and 6b on the cloud 5 to forcibly establish the periodic communications and resets the second timer 51b of the power controller 37 just before it enters deep sleep mode. As a result, the time Tz until the image processing device 3 is back to normal mode to establish the next periodic communication after entering deep sleep mode can be longer. This means that at least more than the certain period of time of the duration Tz in deep sleep mode can be obtained. The conventional image processing device 3 is sometimes back to normal mode soon after entering deep sleep mode. This can prevent that situation, resulting in better power-saving effect.

As described in the first preferred embodiment, also in the second preferred embodiment, the timeout period may be set when each of the first application 41 and the second application 42 establishes the periodic communication with the respective servers 6a and 6b in response to the periodic communication instruction from the periodic communication managing part 44. The power controller 37 may enable the image processing device 3 in normal mode to enter deep sleep mode after the elapse of the timeout period.

Figure 15:
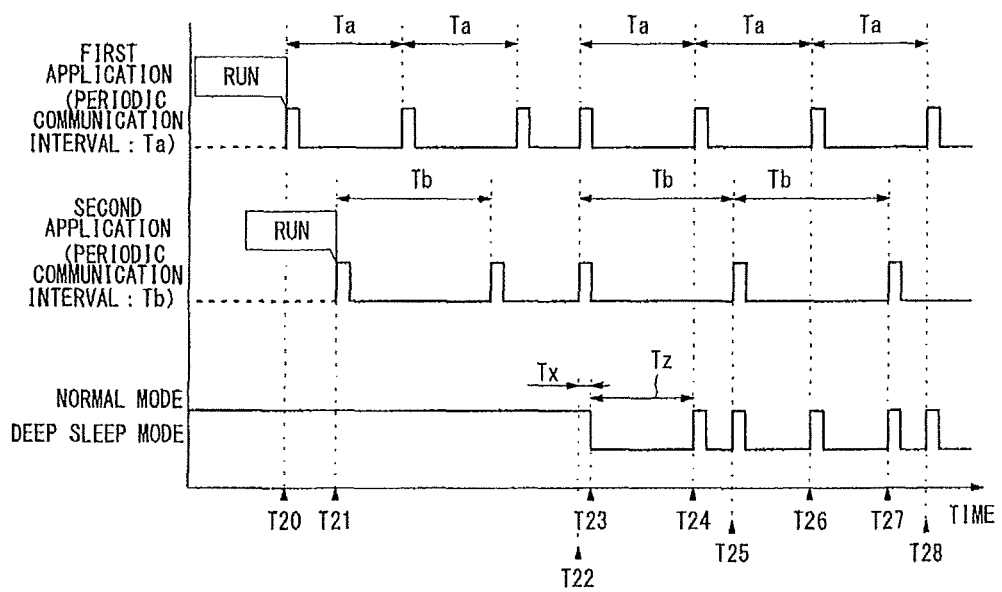
FIG. 15 shows a timing for the first application and the second application to establish the periodic communications by setting the timeout period.

FIG. 15 shows a timing for the first application 41 and the second application 42 to establish the periodic communications by setting the timeout period. As shown in FIG. 15, the first application 41 is started to run at time T20. The first application 41 establishes the connection with the first server 6a, then establishes the periodic communication with the first server 6a at time after the elapse of the first time interval Ta. The second application 42 is started to run at time T21. The second application 42 establishes the connection with the second server 6b, then establishes the periodic communication with the second server 6b at time after the elapse of the second time interval Tb.

The periodic communication managing part 44 outputs the periodic communication instructions to the first application 41 and the second application 42 at T22 which is the predetermined period of time before the time at which the image processing device 3 enters deep sleep mode from normal mode. Also, the measured value of the second timer 51b is reset. The first application 41 and the second application 42 establish the periodic communications with the respective first server 6a and second server 6b at time T22. The first application 41 and the second application 42 set the timeout period Tx which is shorter than the time left until entering deep sleep mode. The image processing device 3 enters deep sleep mode from normal mode at time T23 which is after the elapse of the timeout period Tx.

It is assumed that the first time interval Ta is shorter than the second time interval Tb. In this case, the power controller 37 powers the image processing device 3 back on and put the power mode of the image processing device 3 back to normal mode at T24 at which the second timer 51b measures the first time interval Ta after enabling the image processing device 3 to enter deep sleep mode. After enabling the first application 41 to establish the periodic communication, the power controller 37 enables the image processing device 3 to enter deep sleep mode again. The power controller 37 then powers the image processing device 3 back on and put the power mode of the image processing device 3 back to normal mode at T25 at which the second timer 51b measures the second time interval Tb. After enabling the second application 42 to establish the periodic communication, the power controller 37 enables the image processing device 3 to enter to deep sleep mode again. The above-described process is repeatedly performed after this.

As described above, the image processing device 3 enables each of the first and second applications 41 and 42 to forcibly establish the periodic communication with the respective servers 6a and 6b just before it enters deep sleep mode. The first and second applications 41 and 42 start the periodic communications. The image processing device 3 then is enabled to enter deep sleep mode after the elapse of the predetermined timeout period regardless of the receipt of the periodic communication response from the respective servers 6a and 6b. This makes the time T23 at which the image processing device 3 enters deep sleep mode earlier than the time T14 shown in FIG. 14. The longer duration Tz in deep sleep mode than the duration Tz of FIG. 14 can be obtained, resulting in much better power-saving effect.

The image processing device 3 of the second preferred embodiment establishes the periodic communications with the respective first and second servers 6a and 6b. If the interval between the periodic communications with at least one of the first and second servers 6a and 6b can be changed, the image processing device 3 changes the interval between the periodic communications with either the first server 6a or the second server 6b to match with the interval between the periodic communications with another server 6a or 6b. As a result, the first and the second applications 41 and 42 are controlled to establish the periodic communications with the respective servers 6a and 6b almost at the same time when the image processing device 3 is back to normal mode from deep sleep mode. It is preferable to match the short time interval with the long time interval of the first time interval 53 and the second time interval 54 because the frequency of wake-up from deep sleep mode to normal mode can be reduced. The way of such control is described in detail next.

Figure 16:
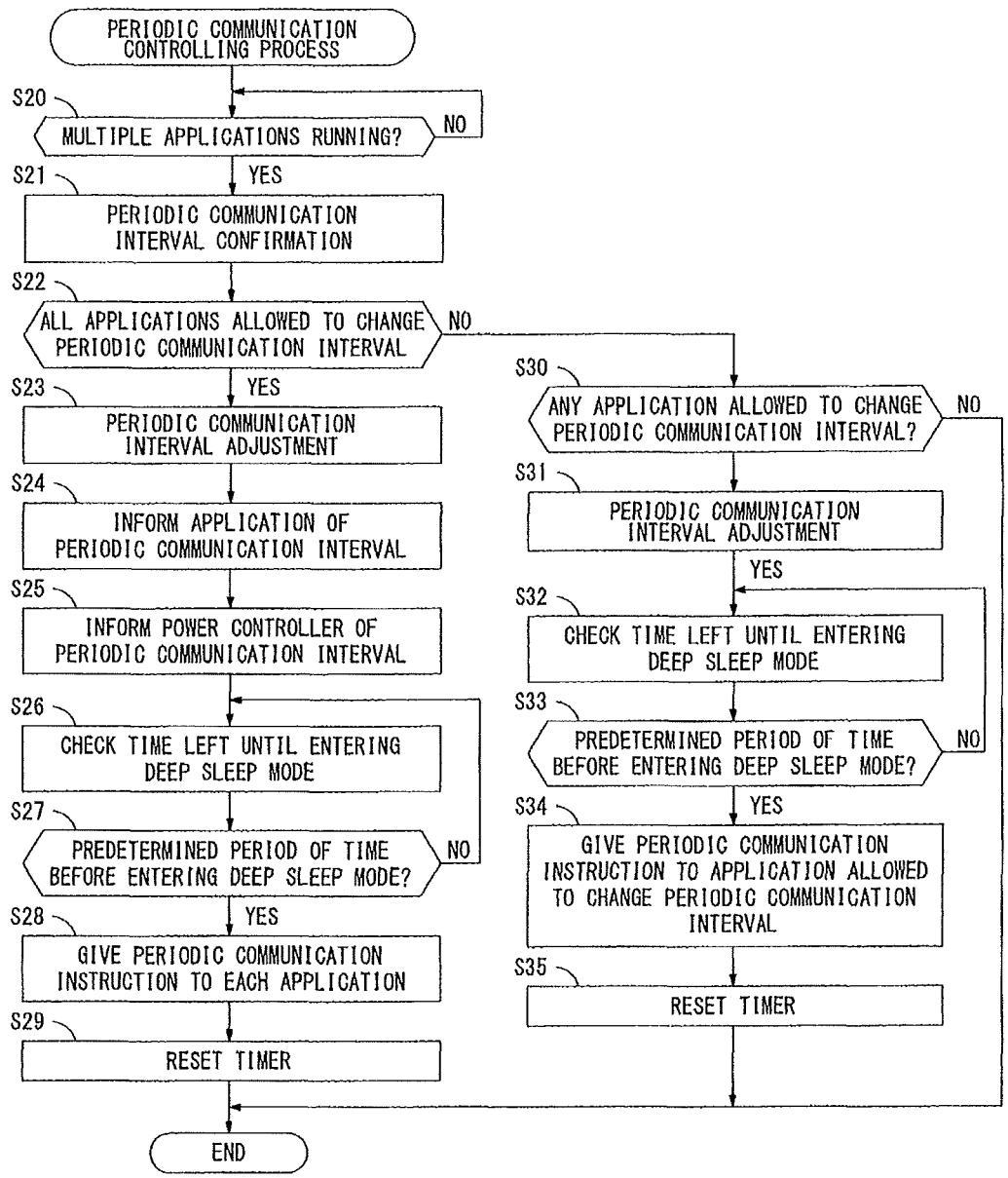
FIG. 16 is a flow diagram explaining an exemplary sequential procedure of the periodic communication controlling process performed by the periodic communication managing part of the second preferred embodiment.

FIG. 16 is a flow diagram explaining an exemplary sequential procedure of the periodic communication controlling process performed by the periodic communication managing part 44. The periodic communication managing part 44 determines if the multiple applications 41 and 42 are started to run in the main controller 30 (step S20). The multiple applications 41 and 42 may be started to run (when a result of step S20 is YES). In this case, the periodic communication managing part 44 obtains the first time interval 53 from the first application 41 and the second time interval 54 from the second application 42. The periodic communication managing part 44 then confirms whether or not the first time interval 53 and the second time interval 54 can be changed (step S21). The periodic communication managing part 44 determines if all of the first and second applications 41 and 42 are allowed to change the respective periodic communication intervals (step S22).

All of the first and second applications 41 and 42 may be allowed to change the respective periodic communication intervals (when a result of step S22 is YES). In this case, the periodic communication managing part 44 performs a periodic communication interval adjustment (step S23). In the periodic communication interval adjustment (step S23), the time interval is adjusted to match with both the first time interval 53 and the second time interval 54 to have the longer duration in deep sleep mode. It is assumed, for example, that the first time interval 53 is shorter than the second time interval 54. In this case, the periodic communication managing part 44 changes the first time interval 53 to match with the second time interval 54, resulting in the longer duration in deep sleep mode. When the image processing device 3 is back to normal mode from deep sleep mode, each of the first and second applications 41 and 42 is enabled to establish the periodic communication almost at the same time. It is assumed that the first time interval 53 can be longer than the second time interval 54 and it can be changed to longer time interval than the second time interval 54. In such a case, the time intervals that match with both the first time interval 53 and the second time interval 54 may be set by changing both the first time interval 53 and the second time interval 54 to be longer. As a result, the duration in deep sleep mode can be much longer. It is assumed that the first time interval 53 cannot be extended to the same time interval as the second time interval 54. In this case, the first time interval 53 may be changed to one-Nth times the second time interval 54 (N is a counting number). When the image processing device 3 is back to normal mode from deep sleep mode, each of the first and second applications 41 and 42 is enabled to establish the periodic communication almost at the same time at every N times. This is the same when the second time interval 54 is shorter than the first time interval 53.

After changing the first time interval 53 and the second time interval 54 through the above-described periodic communication interval adjustment (step S23), the periodic communication managing part 44 informs the first and second applications 41 and 42 of the changed periodic communication intervals (step S24). The first and second applications 41 and 42 then change the first time interval 53 and the second time interval 54 to the changed values. The periodic communication managing part 44 informs the power controller 37 of the changed periodic communication intervals (step S25). The power controller 37 then updates the first time interval 53 and the second time interval 54 in the memory 52 to the changed values.

The periodic communication managing part 44 checks the time left until entering the deep sleep mode (step S26). The periodic communication managing part 44 then determines if it is the predetermined period of time before the time to enter deep sleep mode (step S27). It may not be the predetermined period of time before the time to enter deep sleep mode. In this case, the periodic communication managing part 44 returns to step S26 to wait until it becomes the predetermined period of time before the time to enter deep sleep mode. When it is the predetermined period of time before entering deep sleep mode (when a result of step S27 is YES), the periodic communication managing part 44 instructs the first and the second applications 41 and 42 to establish the periodic communication with the respective servers 6a and 6b (step S28). To be more specific, the periodic communication managing part 44 enables each of the first application 41 and the second application 42 to forcibly establish the periodic communication with the respective servers 6a and 6b the predetermined period of time before entering deep sleep mode. As a result, even when the elapsed time from the previous periodic communication has not reached the first time interval 53 or the second time interval 54, the first application 41 and the second application 42 start the periodic communications with the respective servers 6a and 6b. The periodic communication managing part 44 enables the first application 41 and the second application 42 to forcibly establish the periodic communications with the respective servers 6a and 6b, then resets the second timer 51b of the power controller 37 (step S29). The power controller 37 thus resets the measured value of the second timer 51b which is measuring to enable the image processing device 3 in deep sleep mode to be back in normal mode to the initial value.

All of the first and second applications 41 and 42 may not be allowed to change the respective periodic communication intervals (when a result of step S22 is NO). In this case, the periodic communication managing part 44 determines whether or not there is the application that is allowed to change the periodic communication interval (step S30). More specifically, the periodic communication managing part 44 determines whether or not one of the first and second applications 41 and 42 is allowed to change the periodic communication interval in step S30 in this example. The periodic communication managing part 44 may determine both of the first and second applications 41 and 42 are not allowed to change the periodic communication intervals (when a result of step S30 is NO). In this case, the periodic communication cannot be forcibly established just before the image processing device 3 enters deep sleep mode. The process is complete. The periodic communication managing part 44 may determine one of the first and second applications 41 and 42 is allowed to change the periodic communication interval (when a result of step S30 is YES). In this case, the periodic communication managing part 44 performs the periodic communication interval adjustment (step S31). In the periodic communication interval adjustment (step S31), the changeable periodic communication interval is changed to match with the unchangeable periodic communication interval. It is assumed, for example, that the changeable periodic communication interval is not allowed to be changed to match with the unchangeable periodic communication interval. In this case, the periodic communication managing part 44 may change the changeable periodic communication interval to one-Nth times or N times the unchangeable periodic communication interval (N is a counting number). The periodic communication managing part 44 informs the application that changed the periodic communication interval of the changed value and the power controller 37 of the changed value after adjusting the changeable periodic communication interval to match with the unchangeable periodic communication interval which is not shown in FIG. 16.

The periodic communication managing part 44 checks the time left until entering the deep sleep mode (step S32). The periodic communication managing part 44 then determines if it is the predetermined period of time before the time to enter deep sleep mode (step S33). It may not be the predetermined period of time before the time to enter deep sleep mode. In this case, the periodic communication managing part 44 returns to step S32 to wait until it becomes the predetermined period of time before the time to enter deep sleep mode. When it is the predetermined period of time before entering deep sleep mode (when a result of step S32 is YES), the periodic communication managing part 44 instructs one of the first and the second applications 41 and 42 that changed the periodic communication interval to establish the periodic communication with the server 6a or 6b (step S34). Thus, even when the elapsed time from the previous periodic communication has not reached the first time interval 53 or the second time interval 54, the application starts that changed the periodic communication interval starts the periodic communication with the server 6a or 6b. The periodic communication managing part 44 resets the second timer 51b of the power controller 37 to reset the measured value of the second timer 51b which is measuring to enable the application that changed the periodic communication interval to establish the next periodic communication (step S35). The periodic communication managing part 44 then instructs the application that changed the periodic communication interval on the periodic communication when the image processing device 3 in deep sleep mode is put back in normal mode for the application that is not allowed to change the periodic communication interval to establish the periodic communication. As a result, the periodic communication managing part 44 controls to enable the first and the second applications 41 and 42 to establish the periodic communications at the same time.

Figure 17:
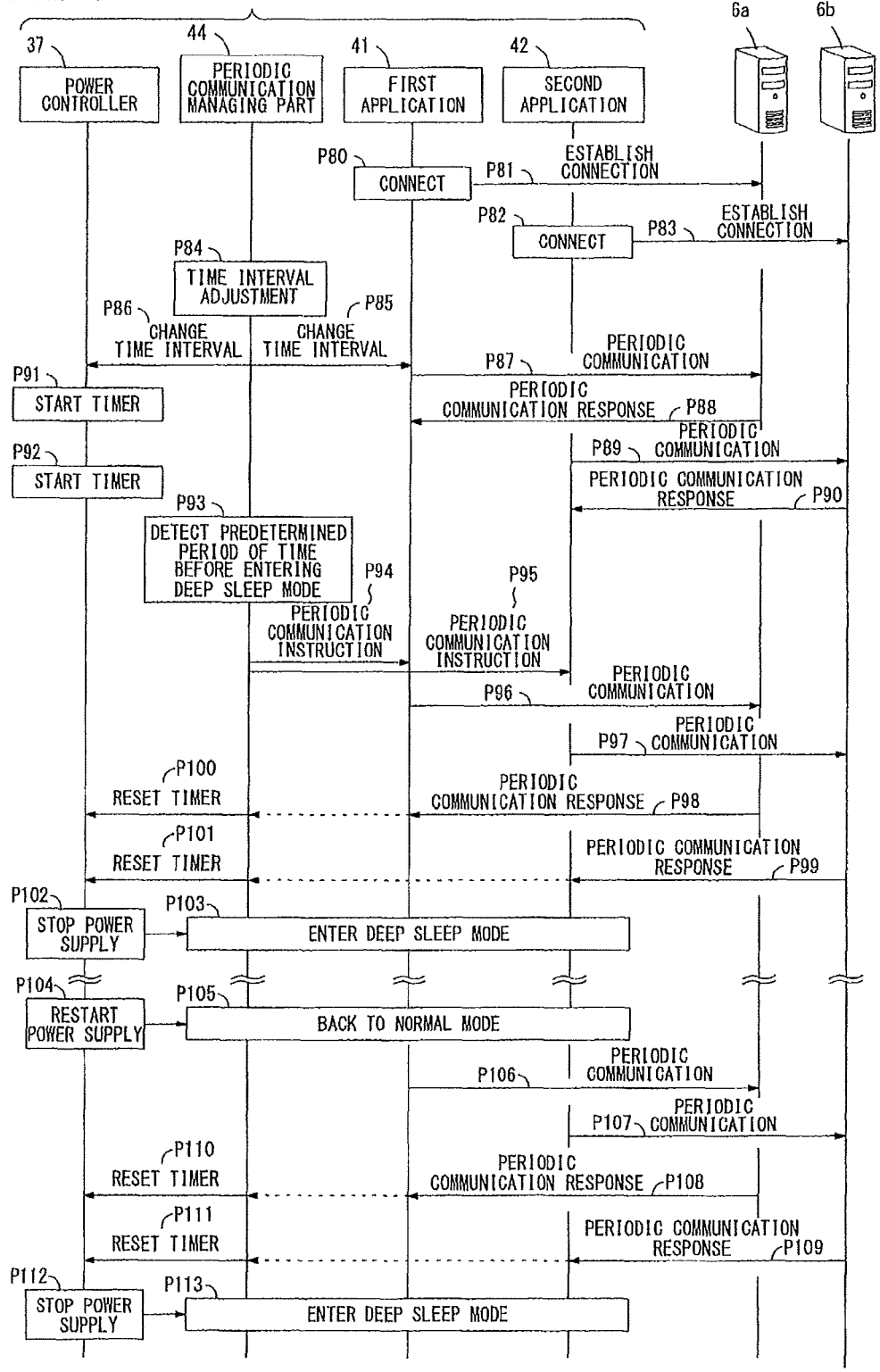
FIG. 17 is a flow diagram explaining an exemplary overall procedure of a process performed when both the first and the second applications are allowed to change the periodic communication intervals.

FIG. 17 is a flow diagram explaining an exemplary overall procedure of a process performed when both the first and the second applications 41 and 42 are allowed to change the periodic communication intervals. When the power mode of the image processing device 3 is in normal mode and the first application 41 runs to connect to the first server 6a (process P80), the connection with the first server 6a is established (process P81). When the second application 42 runs next, the second application 42 connects to the second server 6b (process P82), and establishes the connection with the second server 6b (process P83).

after the first and the second applications 41 and 42 are started to run, the periodic communication managing part 44 performs the periodic communication interval adjustment (process P84). In the periodic communication interval adjustment (process P84), the first time interval 53 is changed to the same time interval as the second time interval 54, for example. The periodic communication managing part 44 informs the first application 41 of the change in the first time interval 53 (process P85), and the power controller 37 of the change in the first time interval 53 (process P86). The first time interval 53 at the first application 41 and the power controller 37 is then changed.

it is assumed that the predetermined period of time (the first time interval 53) has elapsed as the job is not sent and received to and from the first server 6a. In this case, the first application 41 establishes the periodic communication using the connection with the first server 6a (process P87). When receiving the periodic communication from the first application 41 as the connection with the image processing device 3 is maintained, the first server 6a replies the periodic communication response to the periodic communication (process P88). When the periodic communication between the first application 41 and the first server 6a is established, the power controller 37 enables the second timer 51b to start measuring the first time interval 53 (process P91).

it is assumed that the predetermined period of time (the second time interval 54) has elapsed as the job is not sent and received to and from the second server 6b. In this case, the second application 42 establishes the periodic communication using the connection with the second server 6b (process P89). When receiving the periodic communication from the second application 42 as the connection with the image processing device 3 is maintained, the second server 6b replies the periodic communication response to the periodic communication (process P90). When the periodic communication between the second application 42 and the second server 6b is established, the power controller 37 enables the second timer 51b to start measuring the second time interval 54 (process P92).

While the above-described process is performed, the periodic communication managing part 44 waits until it is the predetermined period of time before the time to enter deep sleep mode. After detecting it is the predetermined period of time before the time to enter deep sleep mode (process P93), the periodic communication managing part 44 outputs the periodic communication instruction to each of the first application 41 and the second application 42 (processes P94 and P95). It is assumed that the first time interval 53 or the second time interval 54 stated in advance has not elapsed yet from the previous periodic communications (processes P87 and P89). Even in such a case, the first application 41 and the second application 42 start the periodic communications with the respective first server 6a and second server 6b almost at the same time (processes P96 and P97).

in response to receiving the periodic communication from the first application 41, the first server 6a replies the periodic communication response to the periodic communication (process P98). The first application 41 may establish the periodic communication in response to the periodic communication instruction from the periodic communication managing part 44. In this case, the first application 41 notifies the periodic communication managing part 44 of the receipt of the periodic communication response as receiving the periodic communication response from the first server 6a. After detecting that the first application 41 receives the periodic communication response, the periodic communication managing part 44 instructs the power controller 37 to reset the timer in order to reset the second timer 51b which keeps measuring the first time interval 53 based on the instruction by the power controller 37 (process P100). As a result, the power controller 37 resets the measured value of the first time interval 53 of the second timer 51b to the initial value, then starts the operation to measure the time from the initial value.

in response to receiving the periodic communication from the second application 42, the second server 6b replies the periodic communication response to the periodic communication (process P99). The second application 42 may establish the periodic communication in response to the periodic communication instruction from the periodic communication managing part 44. In this case, the second application 42 notifies the periodic communication managing part 44 of the receipt of the periodic communication response as receiving the periodic communication response from the second server 6b. After detecting that the second application 42 receives the periodic communication response, the periodic communication managing part 44 instructs the power controller 37 to reset the timer in order to reset the second timer 51b which keeps measuring the second time interval 54 based on the instruction by the power controller 37 (process P101). As a result, the power controller 37 resets the measured value of the second time interval 54 of the second timer 51b to the initial value, then starts the operation to measure the time from the initial value.

If it is the time to enter deep sleep mode, the power controller 37 stops the power supply to the main controller 30 (process P102), and enables the power mode of the image processing device 3 to enter deep sleep mode (process P103). The periodic communication managing part 44, the first application 41 and the second application 42 then stop their functions temporarily.

the power controller 37 then keeps the operation of the second timer 51b to measure the time. Once detecting the wake-up time when the measured value matches with both the first time interval 53 and the second time interval 54, the power controller 37 starts again the power supply to the power controller 37 (process P104). The power controller 37 powers the image processing device 3 back on and puts the power mode of the image processing device 3 back to normal mode (process P105). The first and the second applications 41 and 42 detect that both of the first time interval 53 and the second time interval 54 set in advance have elapsed from the previous periodic communications (processes P95 and P96). The first application 41 and the second application 42 then start the periodic communications with the respective first server 6a and second server 6b almost at the same time (processes P106 and P107). After receiving the periodic communication responses from the respective first server 6a and second server 6b (processes P108 and P109), the periodic communication managing part 44 instructs the power controller 37 to reset the timer in order to reset the second timer 51b which keeps measuring the first time interval 53 and the second time interval 54 based on the instruction by the power controller 37 (processes P110 and P111). The power controller 37 stops again the power supply to the main controller 30 (process P112), and enables the power mode of the image processing device 3 to enter deep sleep mode (process P113).

Figure 18:
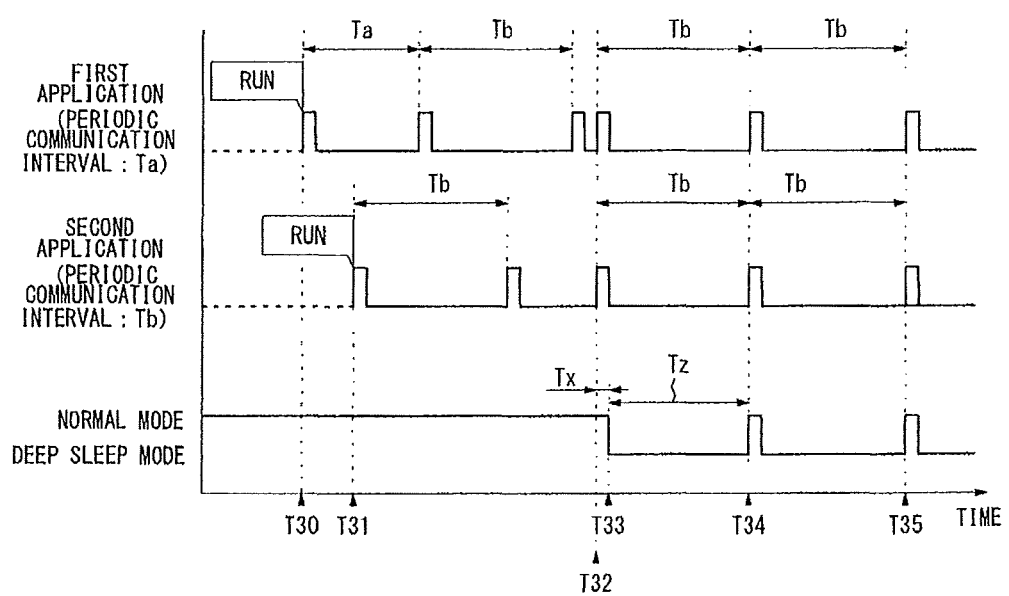
FIG. 18 shows a timing for the first application and the second application to establish the periodic communications when both of the first and the second applications are allowed to change the periodic communication intervals.

FIG. 18 shows a timing for the first server 6a and the second server 6b to establish the periodic communications when both of the first and the second applications 40 and 41 are allowed to change the periodic communication intervals. In the example of FIG. 18, the first application 41 is started to run at time T30. The first application 41 establishes the connection with the first server 6a, then establishes the periodic communication with the first server 6a after the elapse of the first time interval Ta. The second application 42 is started to run at time T31. The second application 42 establishes the connection with the second server 6b, then establishes the periodic communication with the second server 6b after the elapse of the second time interval Tb.

As both of the first server 6a and second server 6b are running, the periodic communication managing part 44 performs the above-described periodic communication interval adjustment, thereby changing the first time interval Ta to be equivalent to the second time interval Tb, for example. After the change, the first application 41 establishes the periodic communications with the server 6a at the second time intervals Tb.

The periodic communication managing part 44 outputs the periodic communication instruction to each of the first application 41 and the second application 42 at T32 which is the predetermined period of time before time at which the image processing device 3 enters deep sleep mode. The first application 41 and the second application 42, therefore, establish the periodic communications with the respective first and second servers 6a and 6b at time T32. The second timer 51b of the power controller 37 is reset at this time, and it starts measuring each of the first time interval Ta and the second time interval Tb from the initial value. The image processing device 3 enters deep sleep mode from normal mode at time T33.

The power controller 37 powers the image processing device 3 back on and puts it back to normal mode at time T34 at which it detects that the first and the second time intervals 53 and 54 (=Tb) have elapsed. The first and the second applications 41 and 42 establish the periodic communications with the respective first and second servers 6a at the same time when the image processing device 3 is powered back on and back to normal mode. After the periodic communications by the first and the second applications 41 and 42, the power controller 37 enables again the image processing device 3 to enter deep sleep mode. After that, the process to power the image processing device 3 back on and put it back to normal mode from deep sleep mode is performed at the certain time intervals Tb. When the image processing device 3 is powered back on and back to normal mode, the periodic communications by the first and the second applications 41 and 42 are established at the same time.

As described above, the aforementioned control is carried out, and the longer duration Tz in deep sleep mode can be obtained and the frequency of wake-up from deep sleep mode to normal mode can be reduced, resulting in much better power-saving effect.

Figure 19:
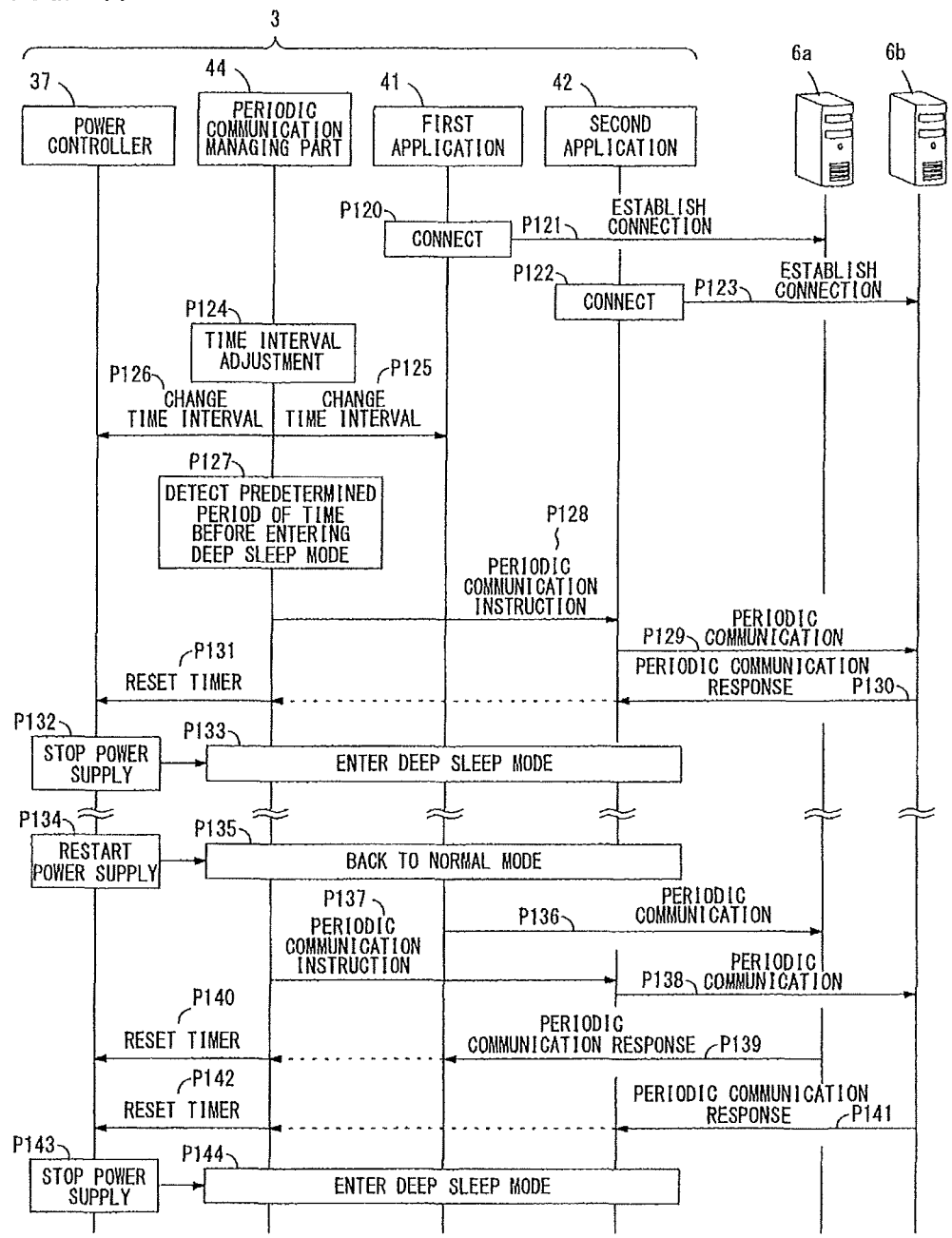
FIG. 19 is a flow diagram explaining an exemplary overall procedure of a process performed when one the first and the second applications is not allowed to change the periodic communication interval.

FIG. 19 is a flow diagram explaining an exemplary overall procedure of a process performed when one the first and the second applications 41 and 42 is not allowed to change the periodic communication interval. When the power mode of the image processing device 3 is in normal mode and the first application 41 runs to connect (process P120), the connection with the first server 6a is established (process P121). When the second application 42 runs next, the second application 42 connects (process P122), and establishes the connection with the second server 6b (process P123).

after the first and the second applications 41 and 42 are started to run, the periodic communication managing part 44 performs the periodic communication interval adjustment (process P124). In the periodic communication interval adjustment (process P124), the second time interval 54 is changed to the equal value to the first time interval 53, for example. The periodic communication managing part 44 informs the second application 42 of the change in the second time interval 54 (process P125), and the power controller 37 of the change in the second time interval 54 (process P126). The second time interval 54 at the second application 42 and the power controller 37 is then changed.

After detecting it is the predetermined period of time before the time to enter deep sleep mode (process P127), the periodic communication managing part 44 outputs the periodic communication instruction to the second application 42 that is allowed to change the periodic communication interval (process P128). It is assumed that the second time interval 54 stated in advance has not elapsed yet from the previous periodic communication. Even in such a case, the second application 42 starts the periodic communication with the second server 6b (process P129). The first time interval 53 set with the first application cannot be changed. The periodic communication managing part 44, therefore, does not output the periodic communication instruction to the first application 41.

in response to receiving the periodic communication from the second application 42, the second server 6b replies the periodic communication response to the periodic communication (process P130). The second application 42 may establish the periodic communication in response to the periodic communication instruction from the periodic communication managing part 44. In this case, the second application 42 notifies the periodic communication managing part 44 of the receipt of the periodic communication response as receiving the periodic communication response from the second server 6b. After detecting that the second application 42 receives the periodic communication response, the periodic communication managing part 44 instructs the power controller 37 to reset the timer in order to reset the second timer 51b which keeps measuring the second time interval 54 based on the instruction by the power controller 37 (process P131). As a result, the power controller 37 resets the measured value of the second time interval 54 of the second timer 51b to the initial value, then starts the operation to measure the time from the initial value. This process is performed just before the image processing device 3 enters deep sleep mode.

If it is the time to enter deep sleep mode, the power controller 37 stops the power supply to the main controller 30 (process P132), and enables the power mode of the image processing device 3 to enter deep sleep mode (process P133). The periodic communication managing part 44, the first application 41 and the second application 42 then stop their functions temporarily.

The power controller 37 then keeps the operation of the second timer 51b to measure the time. Once detecting the wake-up time when the measured value matches with the first time interval 53, the power controller 37 starts again the power supply to the power controller 37 (process P134). The power controller 37 powers the image processing device 3 back on and puts the power mode of the image processing device 3 back to normal mode (process P135). The first application 41 detects that the first time interval 53 stated in advance has elapsed from the previous periodic communication. The first application 41 then starts the periodic communication with the first server 6a (process P136). The periodic communication managing part 44 outputs again the periodic communication instruction to the second application 42 (process P137). It is assumed that the second time interval 54 stated in advance has not elapsed yet from the previous periodic communication (process P128). Even in such a case, the second application 42 starts the periodic communication with the second server 6b (process P138). After the first application 41 and the second application 42 receive the periodic communication responses from the respective first server 6a and second server 6b (processes P139 and P141), the periodic communication managing part 44 instructs the power controller 37 to reset the timer in order to reset the second timer 51b which keeps measuring the first time interval 53 and the second time interval 54 based on the instruction by the power controller 37 (processes P140 and P141). The timers are reset (processes P140 and P141) almost at the same time so that the times for the first application 41 and the second application 42 to establish the periodic communications are synchronized after that. The power controller 37 stops again the power supply to the main controller 30 (process P143), and enables the power mode of the image processing device 3 to enter deep sleep mode (process P144).

Figure 20:
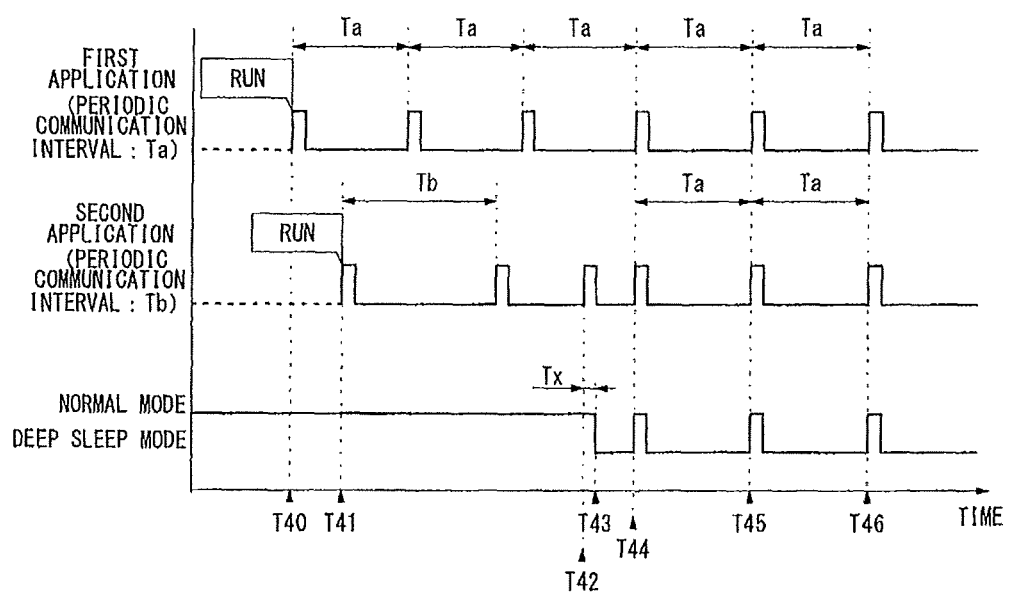
FIG. 20 shows a timing for the first application and the second application to establish the periodic communications when one of the first application and the second application is not allowed to change the periodic communication interval.

FIG. 20 shows a timing for the first application 41 and the second application 42 to establish the periodic communications when one of the first application 41 and the second application 42 is not allowed to change the periodic communication interval. In the example of FIG. 20, the periodic communication interval Ta set with the first application 41 is not allowed to change. In the example of FIG. 20, the first application 41 is started to run at time T40. The first application 41 establishes the connection with the first server 6a, then establishes the periodic communication with the first server 6a after the elapse of the first time interval Ta. The second application 42 is started to run at time T41. The second application 42 establishes the connection with the second server 6b, then establishes the periodic communication with the second server 6b after the elapse of the second time interval Tb.

As both of the first server 6a and second server 6b are started to run, the periodic communication managing part 44 performs the above-described periodic communication interval adjustment, thereby changing the second time interval Tb to be equivalent to the first time interval Ta, for example. After the change, the second application 42 establishes the periodic communications with the server 6b at the first time intervals Ta.

The periodic communication managing part 44 outputs the periodic communication instruction to the second application 42 at time T42 which is the predetermined period of time before time at which the image processing device 3 enters deep sleep mode from normal mode. The second application 42, therefore, establishes the periodic communication with the second server 6b at time T42. The first application 41 does not establish the periodic communication with the first server 6a at this time. The second timer 51b of the power controller 37 is reset at this time, and it starts measuring the second time interval 54 (=Ta) from the initial value. The image processing device 3 enters deep sleep mode from normal mode at time T43.

The power controller 37 powers the image processing device 3 back on and puts it back to normal mode at time T44 at which it detects that the first time interval 53 (=Ta) has elapsed. The first application 41 establishes the periodic communication with the first server 6a. The periodic communication managing part 44 outputs again the periodic communication instruction to the second application 42. The second application 42 then establishes the periodic communication with the second server 6b at time T44. More specifically, the first application 41 and the second application 42 establish the periodic communications almost at the same time at time T44. After completion of the periodic communications by the first application 41 and the second application 42, the power controller 37 enables the image processing device 3 to enter deep sleep mode again. After this, the process to power the image processing device 3 back on and put it back to normal mode is performed at the certain time intervals Ta. When the image processing device 3 is powered back on and back to normal mode, the periodic communications by the first application 41 and the second application 42 are established almost at the same time.

As described above, the aforementioned control is carried out, the frequency of wake-up from deep sleep mode to normal mode can be reduced even when one of the first and the second applications 41 and 42 is not allowed to change the periodic communication interval, resulting in much better power-saving effect.

It is assumed that the first and the second applications 41 and 42 are running on the image processing device 3 and each of the first and the second applications 41 and 42 establishes the connection that enables the constant communication with the respective servers 6a and 6b. Even in such a case, as described above, according to the second preferred embodiment, the duration in deep sleep mode can be longer than before, resulting in high power-saving effect.

Everything else explained in the second preferred embodiment is the same as the first preferred embodiment.

Although the present invention has been described and illustrated in detail, it is clearly understood that the same is by way of illustrated and example only and is not to be taken by way limitation, the scope of the present invention being interpreted by terms of the appended claims.

(Modifications)

While the preferred embodiments of the present invention have been described above, the present invention is not limited to the preferred embodiments. Various modifications may be applied to the present invention.

In the above-described first and second preferred embodiments, there are three steps of the power mode at the image processing device 3, normal mode, sleep mode and deep sleep mode. However, this is given not for limitation. More specifically, the present invention can be applied to any image processing device 3 that has at least two steps of the power mode, normal mode and deep sleep mode (power-saving mode).

According to the second preferred embodiment as described above, the operations when the two servers 6a and 6b are mainly installed on the cloud 5 and two applications 41 and 42 run on the image processing device 3 are described. The above-described operations may also be applied when more than three servers are installed on the cloud 5 and more than three applications run on the image processing device 3.

What is claimed is:

1. An image processing device that is capable of executing a job by working together with a server, comprising:
   an application that establishes a connection that enables a communication with said server, and establishes periodic communications with said server at predetermined time intervals to maintain the connection;
   a periodic communication managing part that manages the periodic communication with said server by said application;
   a timer that measures a time elapsed after said application establishes the periodic communication with said server; and
   a power controller that stops a power supply to the application, wherein
   the periodic communication managing part enables the application to perform the periodic communication with the server based on a result of a measurement by the timer, wherein the periodic communication managing part enables the application to perform the periodic communication with the server and resets the measured time of said timer before the power supply to the application is stopped by the power controller, and
   the power controller re-starts the power supply to the application based on the result of the measurement by the timer.

2. The image processing device according to claim 1, wherein
   said periodic communication managing part resets the measured time of said timer after enabling said application to establish the periodic communication with said server.

3. The image processing device according to claim 2, wherein
   said periodic communication managing part resets the measured time of said timer if receiving a periodic communication response from said server after enabling said application to establish the periodic communication with said server.

4. The image processing device according to claim 3, wherein
said power controller stops the power supply to said periodic communication managing part together with that to said application if the predetermined condition is met, and resets the measured time of said timer if receiving the periodic communication response from said server after stopping the power supply to said periodic communication managing part.

5. The image processing device according to claim 1, wherein
said application sets a timeout period until receiving the periodic communication response from said server shorter than a predetermined period of time when establishing the periodic communication with said server the predetermined period of time before the power supply is stopped by said power controller, and
said power controller stops the power supply to said application when said timeout period has elapsed after said application establishes the periodic communication with said server.

6. The image processing device according to claim 1, wherein
said server includes a first server and a second server,
said application includes:
a first application that establishes the connection that enables the communication with said first server, and establishes the periodic communications with said first server at first time intervals to maintain the connection; and
a second application that establishes the connection that enables the communication with said second server, and establishes the periodic communications with said second server at second time intervals to maintain the connection,
said power controller enables said timer to measure a first elapsed time after said first application establishes the periodic communication with said first server, and
said power controller enables said timer to measure a second elapsed time after said second application establishes the periodic communication with said second server, after stopping the power supply to said first application and said second application if the predetermined condition is met, said power controller starting again the power supply to said first application and said second application when said timer measures said first time interval or said second time interval.

7. The image processing device according to claim 6, wherein
said periodic communication managing part enables each of said first application and said second application to establish the periodic communication with said respective first and second servers and resets said first elapsed time and said second elapsed time measured by said timer before said power controller stops the power supply to said first application and said second application.

8. The image processing device according to claim 6, wherein
said periodic communication managing part enables another one of said first application and said second application to establish the periodic communication with said first server or said second server and resets an elapsed time after said another one of said first application and said second application establishes the periodic communication with said first server or said second server of said first elapsed time and said second elapsed time measured by said timer before said power controller stops the power supply to said first application and said second application when one of said first application and said second application is not allowed to change the time interval between the periodic communications with said first server or said second server.

9. The image processing device according to claim 8, wherein
said periodic communication managing part enables said another one of said first application and said second application to establish the periodic communication with said first server or said second server and resets the elapsed time after said another one of said first application and said second application establishes the periodic communication with said first server or said second server of said first elapsed time and said second elapsed time measured by said timer when the power supply to said first application and said second application is started again due to the elapse of the time interval between the periodic communications with said first server or said second server by said one of said first application and said second application after said power controller stops the power supply to said first application and said second application.

10. The image processing device according to claim 6, wherein
said periodic communication managing part changes said first time interval and said second time interval to a value that matches with both of said first time interval and said second time interval when both of said first application and said second application are allowed to change the time intervals between the periodic communications with said respective first server and second server.

11. The image processing device according to claim 10, wherein
said periodic communication managing part changes the short time interval to match with the long time interval of said first time interval and said second time interval.

12. The image processing device according to claim 1, wherein the application establishes the periodic communications with the server to maintain the connection when the job is not being executed by the image processing device.

13. The image processing device according to claim 1, wherein the application establishes the periodic communications with the server to maintain the connection when the image processing device is in a power saving mode.

14. An image processing system comprising a server and an image processing device capable of executing a job by working together with said server, wherein
said server includes:
a connection managing part that establishes a connection that enables a communication with said image processing device in response to a connection request from said image processing device and maintains the connection with said image processing device by receiving a periodic communication established at predetermined time intervals from said image processing device, and terminates the connection if a predetermined period of time has elapsed without receiving the periodic communication from said image processing device,
said image processing device includes:
an application that establishes the connection that enables the communication with said server by sending the connection request to said server, and establishes the periodic communications with said server at the predetermined time intervals to maintain the connection;
a periodic communication managing part that manages the periodic communication with said server by said application;
a timer that measures a time elapsed after said application establishes the periodic communication with said server; and
a power controller that stops a power supply to the application, wherein
the periodic communication managing part enables the application to perform the periodic communication with the server based on a result of a measurement by the timer, wherein the periodic communication managing part enables the application to perform the periodic communication with the server and resets the measured time of said timer before the power supply to the application is stopped by the power controller, and
the power controller re-starts the power supply to the application based on the result of the measurement by the timer.

15. The image processing system according to claim 14, wherein
said periodic communication managing part resets the measured time of said timer after enabling said application to establish the periodic communication with said server.

16. The image processing system according to claim 15, wherein
said periodic communication managing part resets the measured time of said timer if receiving a periodic communication response from said server after enabling said application to establish the periodic communication with said server.

17. The image processing system according to claim 16, wherein
said power controller stops the power supply to said periodic communication managing part together with that to said application if the predetermined condition is met, and resets the measured time of said timer if receiving the periodic communication response from said server after stopping the power supply to said periodic communication managing part.

18. The image processing system according to claim 14, wherein
said application sets a timeout period until receiving the periodic communication response from said server shorter than a predetermined period of time when establishing the periodic communication with said server the predetermined period time before the power supply is stopped by said power controller, and
said power controller stops the power supply to said application when said timeout period has elapsed after said application establishes the periodic communication with said server.

19. The image processing system according to claim 14, wherein
said server includes a first server and a second server,
said application includes:
a first application that establishes the connection that enables the communication with said first server, and establishes the periodic communications with said first server at first time intervals to maintain the connection; and
a second application that establishes the connection that enables the communication with said second server,
and establishes the periodic communications with said second server at second time intervals to maintain the connection,
said power controller enables said timer to measure a first elapsed time after said first application establishes the periodic communication with said first server, and
said power controller enables said timer to measure a second elapsed time after said second application establishes the periodic communication with said second server, after stopping the power supply to said first application and said second application if the predetermined condition is met, said power controller starting again the power supply to said first application and said second application when said timer measures said first time interval or said second time interval.

20. The image processing system according to claim 19, wherein
said periodic communication managing part enables each of said first application and said second application to establish the periodic communication with said respective first and second servers and resets said first elapsed time and said second elapsed time measured by said timer before said power controller stops the power supply to said first application and said second application.

21. The image processing system according to claim 19, wherein
said periodic communication managing part enables another one of said first application and said second application to establish the periodic communication with said first server or said second server and resets an elapsed time after said another one of said first application and said second application establishes the periodic communication with said first server or said second server of said first elapsed time and said second elapsed time measured by said timer before said power controller stops the power supply to said first application and said second application when one of said first application and said second application is not allowed to change the time interval between the periodic communications with said first server or said second server.

22. The image processing system according to claim 21, wherein
said periodic communication managing part enables said another one of said first application and said second application to establish the periodic communication with said first server or said second server and resets the elapsed time after said another one of said first application and said second application establishes the periodic communication with said first server or said second server of said first elapsed time and said second elapsed time measured by said timer when the power supply to said first application and said second application is started again due to the elapse of the time interval between the periodic communications with said first server or said second server by said one of said first application and said second application after said power controller stops the power supply to said first application and said second application.

23. The image processing system according to claim 19, wherein
said periodic communication managing part changes said first time interval and said second time interval to a value that matches with both of said first time interval and said second time interval when both of said first application and said second application are allowed to change the time intervals between the periodic communications with said respective first server and second server.

24. The image processing system according to claim 23, wherein
said periodic communication managing part changes the short time interval to match with the long time interval of said first time interval and said second time interval.

25. A non-transitory recording medium storing a computer readable program to be executed by an image processing device that is capable of executing a job by working together with a server, the computer readable program executed on said image processing device to function as a system comprising:
an application that establishes a connection that enables a communication with said server, and establishes periodic communications with said server at predetermined time intervals to maintain the connection;
a timer that measures a time elapsed after said application establishes the periodic communication with said server; and
a power controller that stops a power supply to the application, wherein execution of the computer readable program by said image processing device causes said image processing device to execute the steps of:
(1) enabling said application to perform the periodic communication with said server based on a result of a measurement by the timer before the power supply to said application is stopped by said power controller;
(2) resetting the measured time of said timer before the power supply to said application is stopped by said power controller; and
(3) re-starting the power supply from the power controller to the application based on the result of the measurement by the timer.

26. The non-transitory recording medium according to claim 25, wherein the measured time of said timer is reset in said step (2) after said application is enabled to establish the periodic communication with said server in said step (1).

27. The non-transitory recording medium according to claim 26, wherein the measured time of said timer is reset in said step (2) if receiving a periodic communication response from said server after said application is enabled to establish the periodic communication with said server in said step (1).

28. The non-transitory recording medium according to claim 25, wherein
said server includes a first server and a second server,
said application includes:
a first application that establishes the connection that enables the communication with said first server, and establishes the periodic communications with said first server at first time intervals to maintain the connection; and
a second application that establishes the connection that enables the communication with said second server, and establishes the periodic communications with said second server at second time intervals to maintain the connection,
said power controller enables said timer to measure a first elapsed time after said first application establishes the periodic communication with said first server,
said power controller enables said timer to measure a second elapsed time after said second application establishes the periodic communication with said second server, after stopping the power supply to said first application and said second application if the predetermined condition is met, said power controller starting again the power supply to said first application and said second application when said timer measures said first time interval or said second time interval,
each of said first application and said second application is enabled to establish the periodic communication with said respective first and second servers in said step (1) before said power controller stops the power supply to said first application and said second application, and
said first elapsed time and said second elapsed time measured by said timer are reset in said step (2).

29. The non-transitory recording medium according to claim 28, the execution of the computer readable program by said image processing device causing said image processing device to execute the further step of:
(4) changing said first time interval and said second time interval to a value that matches with both of said first time interval and said second time interval when both of said first application and said second application are allowed to change the time intervals between the periodic communications with said first server or said second server.

30. The non-transitory recording medium according to claim 29, wherein
the short time interval is changed in step (4) to match with the long time interval of said first time interval and said second time interval.

31. The non-transitory recording medium according to claim 25, wherein
said server includes a first server and a second server,
said application includes:
a first application that establishes the connection that enables the communication with said first server, and establishes the periodic communications with said first server at first time intervals to maintain the connection; and
a second application that establishes the connection that enables the communication with said second server, and establishes the periodic communications with said second server at second time intervals to maintain the connection,
said power controller enables said timer to measure a first elapsed time after said first application establishes the periodic communication with said first server,
said power controller enables said timer to measure a second elapsed time after said second application establishes the periodic communication with said second server, after stopping the power supply to said first application and said second application if the predetermined condition is met, said power controller starting again the power supply to said first application and said second application when said timer measures said first time interval or said second time interval,
another one of said first application and said second application is enabled to establish the periodic communication with said first server or said second server in said step (1) before said power controller stops the power supply to said first application and said second application when one of said first application and said second application is not allowed to change the time interval between the periodic communications with said first server or said second server, and
an elapsed time after said another one of said first application and said second application establishes the periodic communication with said first server or said second server of said first elapsed time and said second elapsed time measured by said timer is reset in said step (2).

32. The non-transitory recording medium according to claim 31, the execution of the computer readable program by said image processing device causing said image processing device to execute the further steps of:
- (4) enabling said another one of said first application and said second application to establish the periodic communication with said first server or said second server when the power supply to said first application and said second application is started again due to the elapse of the time interval between the periodic communications with said first server or said second server by said one of said first application and said second application after said power controller stops the power supply to said first application and said second application; and
- (5) resetting the elapsed time after said another one of said first application and said second application establishes the periodic communication with said first server or said second server of said first elapsed time and said second elapsed time measured by said timer when said step (3) is performed.

* * * * *